(12) United States Patent
Beckman et al.

(10) Patent No.: US 6,686,438 B1
(45) Date of Patent: Feb. 3, 2004

(54) CARBON DIOXIDE-PHILIC COMPOUNDS AND METHODS OF SYNTHESIS THEREOF

(75) Inventors: Eric J. Beckman, Aspinwall, PA (US); Traian Sarbu, Pittsburgh, PA (US); Thomas J. Styranec, Midland, MI (US)

(73) Assignee: University of Pittsburgh, Pittsburgh, PA (US)

( * ) Notice: Subject to any disclaimer, the term of this patent is extended or adjusted under 35 U.S.C. 154(b) by 0 days.

(21) Appl. No.: 09/668,088

(22) Filed: Sep. 22, 2000

Related U.S. Application Data
(60) Provisional application No. 60/155,960, filed on Sep. 24, 1999.

(51) Int. Cl.[7] .............................................. C08G 64/00
(52) U.S. Cl. ....................................... 528/196; 528/198
(58) Field of Search ................................. 528/196, 198

(56) References Cited

U.S. PATENT DOCUMENTS

| | | | |
|---|---|---|---|
| 3,988,298 A | | 5/1975 | Floryan |
| 5,498,734 A | | 7/1993 | Rieke |
| 5,589,105 A | * | 12/1996 | DeSimone et al. .......... 252/364 |
| 5,639,836 A | * | 6/1997 | DeSimone et al. .......... 526/194 |
| 5,641,887 A | | 6/1997 | Beckman |
| 5,676,705 A | * | 10/1997 | Jureller et al. ............... 510/285 |
| 5,679,737 A | * | 10/1997 | DeSimone et al. .......... 252/364 |
| 5,683,473 A | * | 11/1997 | Jureller et al. ............... 510/285 |
| 5,683,977 A | * | 11/1997 | Jureller et al. ............... 510/285 |
| 5,733,964 A | | 3/1998 | Johnston |
| 5,773,964 A | * | 6/1998 | Peter ............................ 307/73 |
| 5,780,553 A | * | 7/1998 | DeSimone et al. .......... 525/276 |
| 5,789,505 A | * | 8/1998 | Wilkinson et al. .......... 427/421 |
| 5,858,022 A | * | 1/1999 | Romack et al. .............. 510/285 |
| 5,872,257 A | | 2/1999 | Beckman |
| 6,131,421 A | | 10/2000 | Jureller |
| 6,148,644 A | | 11/2000 | Jureller |
| 6,299,652 B1 | | 10/2001 | Jureller |

FOREIGN PATENT DOCUMENTS

| | | |
|---|---|---|
| BE | 07 246321 | 9/1995 |
| EP | 0638353 A | 2/1995 |
| JP | 07 112122 | 5/1995 |

OTHER PUBLICATIONS

Ind. Eng. Chem. Res., 37(8), 3067–3079, 1998, Web Release Date: May 23, 1998 Copyright ©1998 American Chemical Society" Solubility of Homopolymers and Copolymers in Carbon Dioxide M.L. O'Neill, Q. Cao, M. Fang, and K. P. Johnston.*
EU 00965367.6.
European Supplementary Search Report.
European Examination Report.
European Application corresponding present US application.

* cited by examiner

Primary Examiner—Terressa M. Boykin
(74) Attorney, Agent, or Firm—Bartony & Hare, LLP

(57) ABSTRACT

A method of synthesizing a $CO_2$-philic analog of a $CO_2$-phobic compound, includes the step of: reacting the $CO_2$-phobic compound with a $CO_2$-philic compound selected from the group of a polyether substituted with at least one side group including preferably a Lewis base, a polycarbonate, a polycarbonate substituted with at least one side group including preferably a Lewis base, a vinyl polymer substituted with at least one side group including preferably a Lewis base a poly(ether-ester) or a poly(ether-ester) substituted with at least one side group including preferably a Lewis base, to create the $CO_2$-philic analog. A method of synthesizing a $CO_2$-phile includes the step of copolymerizing at least two monomers, wherein a polymer formed from homopolymerization of one of the monomers has a $T_g$ of less than approximately 250 K and a steric factor less than approximately 1.8, at least one of the monomers contains a group that results in a pendant group from the $CO_2$-phile backbone that contains a Lewis base group, and the resultant $CO_2$-phile does not contain both hydrogen bond donors and acceptors.

62 Claims, 18 Drawing Sheets

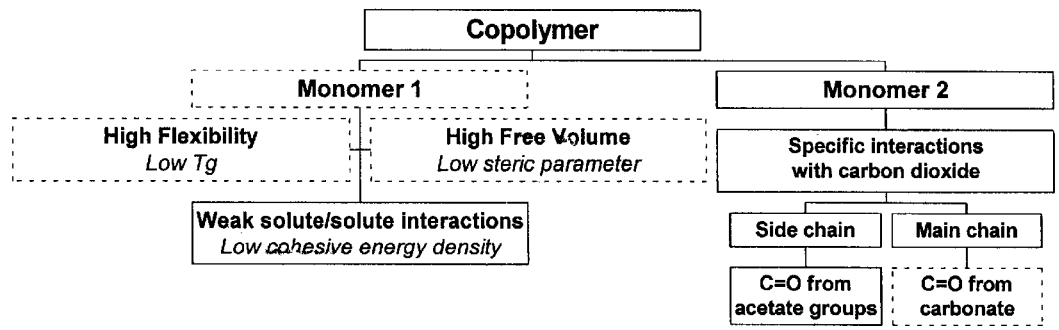
Figure 1. CO$_2$ –philic material design
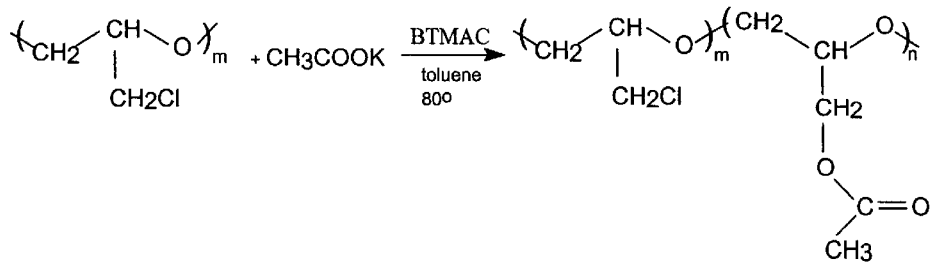
Figure 2. Modification of poly(epichlorohydrin) with acetate groups

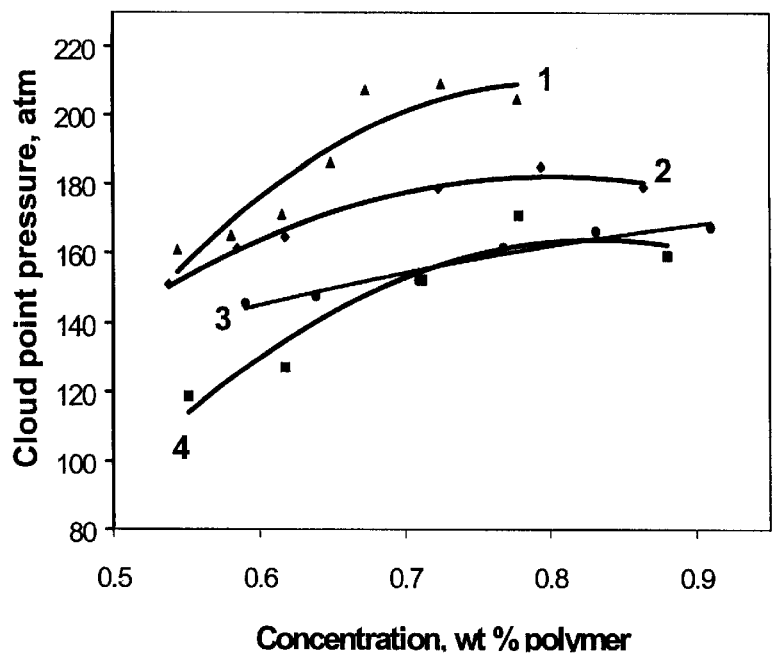
Figure 3. Phase behavior of acetate functionalized epichlorohydrin N = 25 repeat units
1) 33% acetate
2) 40 % acetate
3) PO homopolymer (also 25 repeat units)
4) 45 % acetate

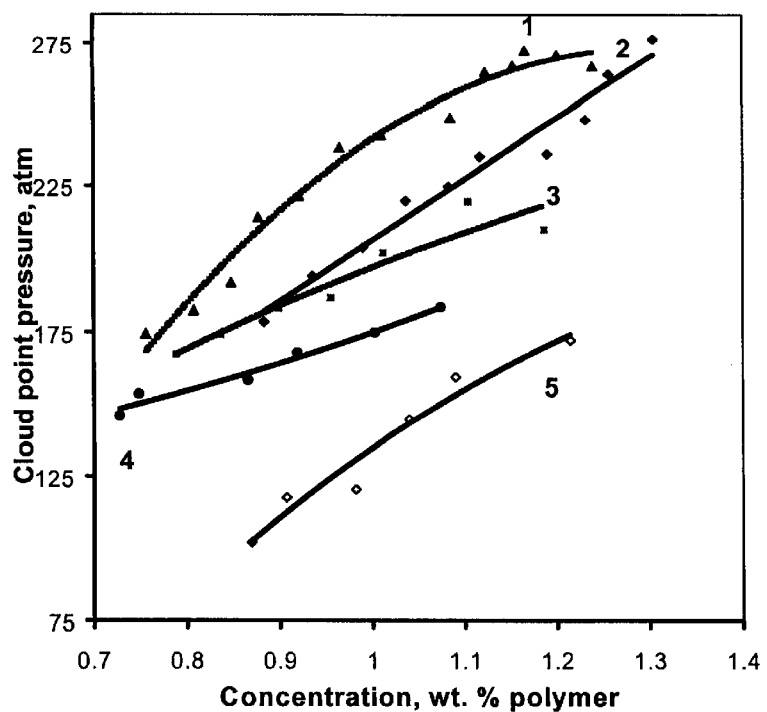
Figure 4. Phase behavior of acetate functionalized poly(epichlorohydrin) N = 7 repeat units
1) Epichlorohydrin homopolymer
2) 28 % acetate
3) 100 % acetate
4) 33 % acetate
5) 38 % acetate

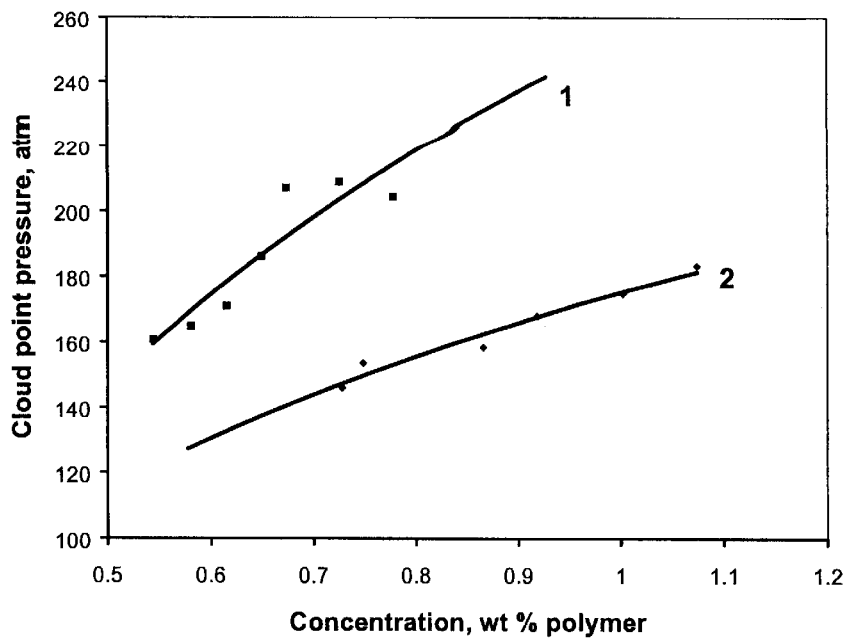
Figure 5. Phase behavior of functionalized poly(epichlorohydrin) with 33 % acetate
1) N = 25 repeat units
2) N = 7 repeat units

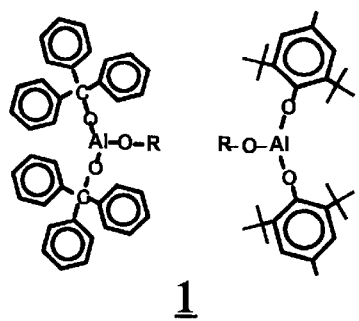
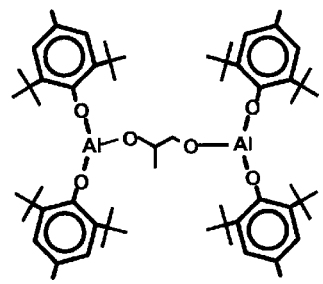
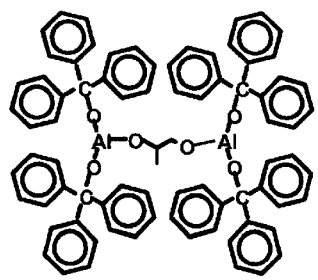
Figure 6. Sterically hindered aluminum catalysts used in the copolymerization of cyclic ethers and carbon dioxide Figure 8. Phase behavior of PO-$CO_2$ copolymer with N = 25 repeat units 1) PO/$CO_2$ copolymer 56 % carbonate 2) PO homopolymer 3) PO/$CO_2$ copolymer 40% carbonate Figure 9. Phase behavior of PO-$CO_2$ copolymers vs. poly(fluoroether)

1) PO/$CO_2$ copolymer N = 220 repeat units, 15% carbonate

2) Krytox, N = 176 repeat units (reference 24)

Figure 10. Phase behavior of EO-$CO_2$ copolymer vs. PEO

1) EO/$CO_2$ copolymer N = 103; 33.7% carbonate

2) PEO, N = 16

Figure 11. Phase behavior of CHO-$CO_2$ copolymers with high content of carbonate units 1) 47% carbonate N = 27
2) 40% carbonate N = 20
3) 50% carbonate N = 16

Figure 12. Phase behavior of CHO-$CO_2$ copolymers with low content of carbonate units 1) 8.8% carbonate N = 124

2) 2.3% carbonate N = 88

Figure 13. Phase behavior of poly(propylene glycol) diol (1), poly(propylene glycol) monobutyl ether (2) and poly(propylene glycol) acetate (3) with 21 repeat units.

Figure 14. Phase behavior of epichlorohydrin/$CO_2$ copolymer compared to acetate modified poly(epichlorohydrin)

1) ECH/$CO_2$ copolymer
   N = 17
   25 % carbonate

2) Modified PECH
   N = 25
   45 % acetate

Figure 15. Phase Behavior of Vinyl Acetate and Ethyl Vinyl Ether Homopolymers

1) Poly(Vinyl acetate) with 90 SRU

2) Poly(Ethyl Vinyl Ether) with 20 SRU

3) Poly(Vinyl acetate) with 70 SRU

Figure 16. Phase Behavior of Vinyl Acetate/Ethyl Vinyl Ether Copolymers with 90 SRU1) 39.8 % VA 2) 22.4 % VA 3) VA homopolymer Figure 17. Phase Behavior of Vinyl Acetate/Ethyl Vinyl Ether Copolymers with 70 SRU 1) 67 % VA 2) 63 % VA 3) VA homopolymer 4) 18.47 % VA Figure 18. Phase Behavior of Vinyl Acetate/Ethyl Vinyl Ether Copolymers 1) 135 SRU, 46.6 % VA 2) 90 SRU, 39.8 % VA (Reactive Functional Group)[(Monomer 1)$_x$(Monomer 2)$_y$](End Group)

CARBON DIOXIDE-PHILIC COMPOUNDS AND METHODS OF SYNTHESIS THEREOF

RELATED APPLICATION

The present application is related to U.S. Provisional Patent Application Ser. No. 60/155,960, filed Sep. 24, 1999, assigned to the assignee hereof, the disclosure of which is incorporated herein by reference.

This invention was made with Government support under grant No. 9523993 awarded by the National Science Foundation. The Government has certain rights in this invention.

FIELD OF THE INVENTION

The present invention relates to compounds that are soluble in or miscible in carbon dioxide and to methods of synthesizing such compounds.

BACKGROUND OF THE INVENTION

Various publications are referenced herein to, for example, clarify the general state of the art. Reference to a publication herein is not an admission that the publication is prior art or relevant to the patentability of the present invention.

The feasibility of using carbon dioxide or $CO_2$ as a process solvent has been extensively investigated in both academic and industrial circles because $CO_2$ is considered to be an environmentally benign solvent. Previous solubility parameter calculations using equation of state information suggested that the solvent power of $CO_2$ was similar to that of short n-alkanes, leading to hopes that $CO_2$ could replace a wide variety of non-polar organic solvents. King, J. W., Poly. Mat. Sci. Eng. Prepr. (1984), 51, 707. Although such solubility parameter values precluded the use of $CO_2$ for processing of polar or hydrophilic materials, it was believed that addition of conventional alkyl-functional surfactants could effectively deal with the problem. However, early attempts to employ conventional surfactants in $CO_2$ failed as a result of the poor solubility of the amphiphiles, despite the fact that these same molecules exhibited adequate solubility in ethane and propane. Consani, K. A.; Smith, R. D.; J. Supercrit. Fl. (1990), 3, 51. It was later discovered that the early solubility parameter calculations, while mathematically correct, failed to note that the absolute value was inflated by as much as 20% by the strong quadropole moment of $CO_2$ (which also inflates its critical pressure). Myers, A. L.; Prausnitz, J. M., Ind. Eng. Chem. Fundam. (1965), 4, 209.

Johnston and colleagues suggested polarizability/volume as a better quantity by which to judge solvent power. O'Shea, K.; Kirmse, K.; Fox, M. A.; Johnston, K. P.; J. Phys. Chem. (1991), 95, 7863 (b) McFann, G. J.; Howdle, S. M.; Johnston, K. P.; AIChE J. (1994), 40, 543 (c) Johnston, K. P.; Lemert, R. M.; in Encyclopedia of Chemical Processing and Design, McKetta, J. J., Ed; Marcel Dekker: New York (1996), 1. On the basis of polarizability/volume, $CO_2$ is a poor solvent compared to short n-alkanes. As the 1980's drew to a close, a number of research groups began to explore the design of $CO_2$-philic materials, (that is, compounds which dissolve in or are miscible in $CO_2$ at significantly lower pressures than alkyl functional analogs). For example, Harrison et al. generated a hybrid alkyl/fluoroalkyl surfactant that both dissolved in $CO_2$ and solubilized significant amounts of water. Harrison, K.; Goveas, J.; Johnston, K. P.; O'Rear, E. A.; Langmuir (1994), 10, 3536. DeSimone and coworkers generated homo- and copolymers of fluorinated acrylates which exhibit complete miscibility with $CO_2$ at moderate pressures. DeSimone, J. M.; Guan, Z.; Elsbernd, C. S.; Science (1992), 257, 945. Block copolymers featuring fluorinated acrylate monomers were used to support dispersion polymerization in $CO_2$, allowing generation of micron-size monodisperse spheres. Hsiao, Y. L.; Maury, E. E.; DeSimone, J. M.; Mawson, S. M.; Johnston, K. P.; Macromolecules (1995), 28, 8159. Fluoroether-functional amphiphiles have been used to support emulsion polymerization as described in Adamsky, F. A.; Beckman, E. J.; Macromolecules (1994), 27, 312, solubilize proteins as described in (a) Ghenciu, E.; Russell, A. J.; Beckman, E. J.; Biotech. Bioeng (1998), 58, 572 (b) Ghenciu, E.; Beckman, E. J.; Industr. Eng. Chem. Res. (1997), 36, 5366; and Johnston, K. P.; Harrison, K. L.; Clarke, M. J.; Howdle, S.; Heitz, M. P.; Bright, F. V.; Carlier, C. Randolph, T. W.; Science (1996), 271, 624, and extract heavy metals from soil and water as described in (Yazdi, A. V.; Beckman, E. J.; Ind. Eng. Chem. (1997), 36, 2368; and Li, J.; Beckman, E. J.; Industr. Eng. Chem. Res. (1998), 37, 4768.

In general, compounds not soluble or miscible in $CO_2$ (that is, $CO_2$-phobic compounds) can be made soluble or miscible in $CO_2$ by synthesizing analogs of such compounds incorporating one or more $CO_2$-philic groups. Processes and reactions that are normally not possible in $CO_2$, are thereby made possible. For example, surfactants, chelating agents and reactants for use in carbon dioxide can be synthesized in this manner. $CO_2$-phobic compounds that can be modified with $CO_2$-philic groups to create $CO_2$-philic analogs for processing in $CO_2$ are disclosed, for example, in U.S. patent application Ser. No. 09/106,480, entitled Synthesis of Hydrogen Peroxide and filed Jun. 29, 1998, the disclosure of which is incorporated herein by reference, in which hydrogen peroxide is synthesized in $CO_2$ using a $CO_2$-philic functionalized anthraquinone reactant. Moreover, $CO_2$-philic chelating agents for extraction of metals in carbon dioxide are disclosed U.S. Pat. No. 5,641,887 and U.S. Pat. No. 5,872,257, the disclosures of which are incorporated herein by reference. Other $CO_2$-philic functionalized compounds are disclosed in U.S. Pat. No. 5,589.105, U.S. Pat. No. 5,789,505, U.S. Pat. No. 5,639,836, U.S. Pat. No. 5,679,737, U.S. Pat. No. 5,733,964, U.S. Pat. No. 5,780,553, U.S. Pat. No. 5,858,022, U.S. Pat. No. 5,676,705, U.S. Pat. No. 5,683,977, and U.S. Pat. No. 5,683,473, the disclosures of which are incorporated herein by reference.

It has been theorized that only molecules with very low solubility parameters (that is, fluorine-containing and silicon-containing molecules) are sufficiently $CO_2$-philic to synthesize $CO_2$-philic analogs or amphiphiles suitable for commercial processing in $CO_2$. O'Neill, M. L., Cao, Q.; Fang, M.; Johnston, K. P.; Wilkinson, S. P.; Smith, C. D.; Kerschner, J. L.; Jureller, S. H.; Ind. Eng. Chem. Res. (1998), 37, 3067. Indeed, it is the common belief in the art that only fluorine-containing and silicon-containing molecules are viable solutions in synthesizing commercially viable $CO_2$-philic analogs. The most successful $CO_2$-philic modifiers or moieties to date are fluorinated compounds. Despite success in development of fluorinated and silicon-containing $CO_2$-philic amphiphiles, the cost (on a mass basis) of these materials (typically, on the order of $1/gram) renders the economics of a process unfavorable unless the amphiphile can be efficiently recycled. Whereas in-process recycling of a "$CO_2$-phile" may at times be straightforward, this is not true in all cases where $CO_2$ has been proposed as a replacement for organic solvents.

It is very desirable to develop $CO_2$-philic compounds or $CO_2$-philes that are effectively soluble in or miscible in $CO_2$ while being relatively inexpensive to synthesize and use.

SUMMARY OF THE INVENTION

The present invention provides, generally, a method of synthesizing a $CO_2$-philic analog of a $CO_2$-phobic compound, comprising the step of: reacting the $CO_2$-phobic compound with a $CO_2$-philic compound to create the $CO_2$-philic analog. Preferably, the $CO_2$-philic compound contains no F or Si.

Preferably, the $CO_2$-philic compound is a polyether substituted with at least one side group including a group that interacts favorably with or has an affinity for $CO_2$ (preferably a Lewis base group), a poly(ether-carbonate), a poly(ether-carbonate) substituted with at least one side group including preferably a Lewis base, a vinyl polymer substituted with at least one side group including preferably a Lewis base, a poly(ether-ester) or a poly(ether-ester) substituted with at least one side group including preferably a Lewis base. Preferably, the $CO_2$-philic compound contains no F or Si atoms. The $CO_2$-philic analog of the $CO_2$-phobic compound has increased solubility or miscibility in $CO_2$ (that is, increased $CO_2$-philic nature) compared to the $CO_2$-phobic compound.

In one embodiment, the $CO_2$-philic compound is a polyether copolymer including the repeat units

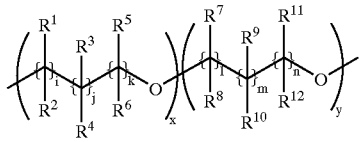

wherein $R^1$, $R^2$, $R^3$, $R^4$, $R^5$, $R^6$, $R^7$, $R^8$, $R^9$, $R^{10}$, $R^{11}$, and $R^{12}$ are, independently, the same or different, H, an alkyl group, $—(R^{22'})_z R^{22}$, or $R^4$ and $R^6$ form of carbon cyclic chain of 3 to 8 carbon atoms. $R^{22'}$ is a spacer or connecting group, and preferably is an alkylene group, and z is 0 or 1. $R^{22}$ is a group that interacts favorably with $CO_2$ and is preferably a Lewis base group. Preferably, at least one of $R^1$, $R^2$, $R^3$, $R^4$, $R^5$, $R^6$, $R^7$, $R^8$, $R^9$, $R^{10}$, $R^{11}$, and $R^{12}$ is $—(R^{22'})_z R^{22}$.

In the above equation, i, j, k, l, m, and n are independently, the same or different, 0, 1 or 2. At least one of i, j, and k is 1 or 2, and at least one of l, m, and is 1 or 2. x and y are integers. Preferably, i, j, k, l, m, and n are 0 or 1. More preferably, i is 0, j is 1, k is 1, l is 0, m is 1 and n is 1. In the case that one of i, j, k, l, m, or n is 2, each of the substituents on the two carbon atoms can be different. In that regard, for example, $—(CR^1R^2)_2—$ expands to $—(CR^1R^2-CR^{1'}R^{2'})—$ wherein $R^1$, $R^2$, $R^{1'}$, and $R^{2'}$ are, independently, the same or different, H, an alkyl group, $—(R^{22'})_z R^{22}$. Likewise, pendant R's on adjacent carbons can form a carbon chain of 3 to 8 carbon atoms.

In several embodiments $R^{22'}$ is $—(CH_2)_a—$ and a is an integer between 0 and 5. Preferably, a is 1 or 2. Suitable Lewis base groups $R^{22}$, include, but are not limited to, carbonyl-containing groups such as $—O—C(O)—R^{23}$ or $—C(O)—R^{23}$, $—O—P(O)—(O—R^{23})_2$, or $—NR^{23}R^{23'}$, wherein $R^{23}$ and $R^{23'}$ are preferably independently, the same or different, an alkyl group.

In one embodiment in which i is 0, j is 1, k is 1, l is 0, m is 1 and n is 1, $R^3$, $R^4$, $R^5$, $R^9$, $R^{10}$, and $R^{11}$ are H, $R^6$ is an alkyl group and $R^{12}$ is a Lewis base. For example, the lewis base group can be $O—C(O)—R^{23}$. In one such embodiment, $R^{23}$ is a methyl group. In one embodiment the methyl group is substituted with a Cl ($—CH_2Cl$).

Preferably, the polyether copolymer contains no F or Si atoms.

In the repeat units of the polyether, x and y are integers. Preferably x and y are each at least 1. Preferably, the total chain length of the $CO_2$-philic group (x+y) is less than approximately 400 repeat units. More preferably, the total chain length of the $CO_2$-philic group (x+y) is less than approximately 200 repeat units. For many application (for example, surfactants) the total chain length is preferably between 5 and 50 repeat units. More preferably, the chain length in such applications is between approximately 20 to 40 repeat units. The percentage of repeat units including a Lewis base group is preferably in the range of approximately 1 to approximately 50%. More preferably, the percentage of repeat units including a Lewis base group is in the range of approximately 5 to approximately 35%. Even more preferably, the percentage of repeat units including a Lewis base group is in the range of approximately 10 to approximately 25%.

In another embodiment, the $CO_2$-philic compound is a poly(ether-carbonate) copolymer including the repeat units:

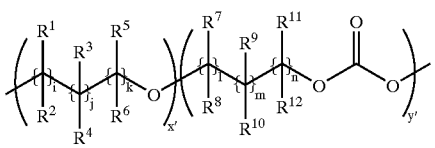

wherein $R^1$, $R^2$, $R^3$, $R^4$, $R^5$, $R^6$, $R^7$, $R^8$, $R^9$, $R^{10}$, $R^{11}$, and $R^{12}$ are, independently, the same or different, H, an alkyl group, $—(R^{22'})_z R^{22}$, or $R^4$ and $R^6$ form of carbon cyclic chain of 3 to 8 carbon atoms as described above. Likewise, i, j, k, l, m and n are as described above (0, 1 or 2). Preferably, i, j, k, l, m and n are 0 or 1. In several embodiments, i and l are 0, and j, k, m and n are 1. In this copolymer a Lewis base group is incorporated into the copolymer backbone. The copolymer can also include one or more pendant groups that react favorably with $CO_2$ (preferably, Lewis base groups). Preferably, the poly(ether-carbonate) copolymer contains no F or Si atoms.

In one embodiment i and l are 0, j, k, m and n are 1, $R^3$, $R^4$, $R^5$, $R^9$, $R^{10}$, and $R^{11}$ are H, $R^6$ is an alkyl group (for example, a methyl group) and $R^{12}$ is an alkyl group (for example, a methyl group).

In the repeat units of the polycarbonate, x' and y' are integers and, preferably, each is at least 1. Preferably, the total chain length of the $CO_2$-philic group (x'+y') is less than approximately 400 repeat units. More preferably, the total chain length of the $CO_2$-philic group is less than approximately 200 repeat units. For many application (for example, surfactants) the total chain length is preferably between 5 and 50 repeat units. More preferably, the chain length in such applications is between approximately 20 to 40 repeat units. The percentage of repeat units including the carbonate linkage (that is, the Lewis base in the copolymer backbone indicated by y') is preferably in the range of approximately 1 to approximately 50%. More preferably, the percentage of repeat units including the carbonate linkage is in the range of approximately 5 to approximately 35%. Even more preferably, the percentage of repeat units including the carbonate linkage is in the range of approximately 10 to approximately 25%.

In one aspect, the vinyl polymer is a copolymer including the repeat units:

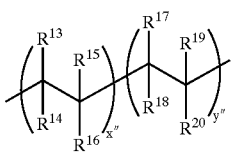

wherein $R^{13}$, $R^{14}$, $R^{15}$, $R^{16}$, $R^{17}$, $R^{18}$, $R^{19}$, and $R^{20}$ are, independently, the same or different, H, an alkyl group, an alkenyl group, $—O—R^{24}$, $—(R^{22'})_z R^{22}$, wherein, z, $R^{22'}$ and $R^{22}$ are as described above. Preferably, at least one of $R^{13}$, $R^{14}$, $R^{15}$, $R^{16}$, $R^{17}$, $R^{18}$, $R^{19}$, and $R^{20}$ is $-(R^{22'})_z R^{22}$. x" and y" are integers. The vinyl copolymer preferably contains no F or Si atoms.

In several embodiment, $R^{22'}$ is $-(CH_2)_a-$ and a is an integer between 0 and 5. In such embodiments, a is preferably 1 or 2 and $R^{22}$ is, for example, $-O-C(O)-R^{23}$, $-C(O)-R^{23}$, $-O-P(O)-(O-R^{23})_2$, or $-NR^{23}R^{23'}$, wherein $R^{23}$ and $R^{23'}$ are independently, the same or different, an alkyl group.

In the polyvinyl copolymer, x" and y" are integers and preferably each is at least 1. Preferably, the total chain length of the $CO_2$-philic group (x"+y") is less than approximately 400 repeat units. More preferably, the total chain length of the $CO_2$-philic group is less than approximately 200 repeat units. For many application (for example, surfactants) the total chain length is preferably between 5 and 50 repeat units. More preferably, the chain length in such applications is between approximately 20 to 40 repeat units. The percentage of repeat units including a Lewis base is preferably in the range of approximately 1 to approximately 50%. More preferably, the percentage of repeat units including a Lewis base is in the range of approximately 5 to approximately 35%. Even more preferably, the percentage of repeat units including a Lewis base is in the range of approximately 10 to approximately 25%.

In another aspect, the $CO_2$-philic compound is a poly (ether-ester) copolymer including the repeat units

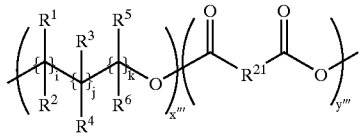

wherein $R^1$, $R^2$, $R^3$, $R^4$, $R^5$ and $R^6$ are as defined above, and i, j and k are as defined above (0, 1 or 2). Preferably, i, j, k, l, m and n are 0 or 1. In several embodiments, i and l are 0, and j, k, m and n are 1. $R^{21}$ is a connecting group that can, for example, be an alkylene group (a difunctional alkyl group), a cycloalkylene group (a difunctional cycloalkyl group), a difunctional ester group, (for example, $-(CR^{25}R^{26})_{p'}-$, $-(CR^{27}R^{28})_{p''}-$), a difunctional ether group (for example, $-(CR^{25}R^{26})_{p'}-O-(CR^{27}R^{28})_{p''}-$. $R^{25}$, $R^{26}$, $R^{27}$ and $R^{28}$ are preferably independently H or an alkyl group. x'" and y'" are integers.

Such poly(ether ester) copolymers include a Lewis base group in the copolymer backbone. The copolymer can also include one or more pendant groups that interact favorably with $CO_2$ (preferably, Lewis base groups). In that reagard, at least one of $R^1$, $R^2$, $R^3$, $R^4$, $R^5$ and $R^6$ can be $-(R^{22'})_z R^{22}$, wherein $R^{22'}$ and $R^{22}$ are as defined above. The group $R^{22}$ can, for example, be $O-C(O)-R^{23}$, $-C(O)-R^{23}$, $-O-P(O)-(O-R^{23})_2$, or $-NR^{23}R^{23'}$, wherein $R^{23}$ and $R^{23'}$ are as defined above.

In a number of embodiments, $R^{22'}$ is $-(CH_2)_a-$ and a is an integer between 0 and 5. In several such embodiments, a is 1 or 2 and i is 0, j is 1, and k is 1.

In the polyvinyl copolymer, x'" and y'" are integers and preferably each is at least 1. Preferably, the total chain length of the $CO_2$-philic group (x'"+y'") is less than approximately 400 repeat units. More preferably, the total chain length of the $CO_2$-philic group is less than approximately 200 repeat units. For many application (for example, surfactants) the total chain length is preferably between 5 and 50 repeat units. More preferably, the chain length in such applications is between approximately 20 to 40 repeat units. The percentage of repeat units including the ester linkage (that is, the Lewis base in the copolymer backbone indicated by y'") is preferably in the range of approximately 1 to approximately 50%. More preferably, the percentage of repeat units including the carbonate linkage is in the range of approximately 5 to approximately 35%. Even more preferably, the percentage of repeat units including the carbonate linkage is in the range of approximately 10 to approximately 25%.

The polyether copolymers, poly(ether-carbonate) copolymers, vinyl copolymers and poly(ether-ester) copolymers) described above are preferably not alternating copolymers. Moreover, other monomer or repeat units can incorporated in the copolymers (for example, between the repeat units set forth above).

The present invention also provides a surfactant for use in carbon dioxide, the surfactant includes a $CO_2$-phobic group covalently linked to a $CO_2$-philic segment, wherein the $CO_2$-philic segment includes a polyether substituted with at least one side group including a group that interacts favorably with $CO_2$ (preferably a Lewis base group), a poly(ether-carbonate), a poly(ether-carbonate) substituted with at least one side group including preferably a Lewis base, a vinyl polymer substituted with at least one side group including preferably a Lewis base, a poly(ether-ester) or a poly(ether-ester) substituted with at least one side group including preferably a Lewis base. The polyether, polycarbonate, vinyl polymer and poly(ether-ester) are preferably copolymers as described above.

The $CO_2$-phobic group of the surfactants of the present invention can be generally any head group usable in surfactants, including, but not limited to, H, a carboxylic acid group, a hydroxy group, a phosphate group, a phosphate ester group, a sulfonyl group, a sulfonate group, a sulfate group, a branched or straight chained polyalkylene oxide group, an amine oxide group, an alkenyl group, a nitryl group, a glyceryl group, an aryl group unsubstituted or substituted with an alkyl group or an alkenyl group, a carbohydrate unsubstituted or substituted with an alkyl group or an alkenyl group, an alkyl ammonium group, or an ammonium group. Carbohydrates groups include, for example sugars such as sorbitol, sucrose, or glucose. The $CO_2$-phobic group may likewise include an ion selected from the group of $H^+$, $Na^{+2}$, $Li^+$, $K^+$, $NH_4^+$, $Ca^{+2}$, $Mg^{+2}$, $Cl^-$, $Br^-$, $I^-$, mesylate and tosylate.

The present invention also provides a chelating agent for use in carbon dioxide. The chelating agent includes a $CO_2$-phobic chelating group covalently linked to a $CO_2$-philic segment, wherein the $CO_2$-philic segment includes a polyether substituted with at least one side group including a group that interacts favorably with $CO_2$ (preferably a Lewis base), a polycarbonate, a polycarbonate substituted with at least one side group including preferably a Lewis base, a vinyl polymer substituted with at least one side group including preferably a Lewis base a poly(ether-ester) or a poly(ether-ester) substituted with at least one side group including preferably a Lewis base. The polyether, polycarbonate, vinyl polymer and poly(ether-ester) are preferably copolymers as described above. The chelating group may, for example, be a polyaminocarboxillic acid group, a thoicarbamate group, a dithoicarbamate group, a thiol group, a dithiol group, a picolyl amine group, a bis(picolyl amine) group or a phosphate group.

The present invention also provides a method of synthesizing a $CO_2$-phile including the step of copolymerizing at least two monomers, wherein a polymer formed from homopolymerization of one of the monomers has a $T_g$ of less than approximately 250 K and a steric factor less than approximately 1.8. At least one of the monomers results in a group in the copolymer that interacts favorably with $CO_2$ (for example, a Lewis base group), and the resultant $CO_2$-phile does not contain both hydrogen bond donors and acceptors. For example, a first monomer can be selected wherein a polymer formed from homopolymerization of the first monomers has a $T_g$ of less than approximately 250 K and a steric factor less than approximately 1.8, while a second monomer results in a repeat unit within the copolymer 15 that includes a Lewis base group (either in the copolymer backbone or pendant therefrom).

The $CO_2$-phile is preferably a polyether, a polycarbonate, a vinyl copolymer or a poly(ether-ester) as described above. A Lewis base group, when pendant, is preferably separated from the $CO_2$-phile backbone by 0 to 5 atoms (more preferably, 1 to 2 atoms).

The present invention also provides a method of synthesizing a $CO_2$-phile comprising the step of copolymerizing carbon dioxide and at least one oxirane. The oxirane may, for example, be epichlorohydrin, ethylene oxide, propylene oxide or cyclohexene oxide.

Prior to the present invention, only fluorous and silicon polymers were thought to be generally suitable for use in creating $CO_2$-philic analogs of $CO_2$-phobic compounds. However, the hydrocarbon $CO_2$-philic compounds and groups of the present invention exhibit phase boundaries in $CO_2$ that occur at pressures comparable to those of fluorinated polyethers of similar chain length, and substantially lower than those of silicones. Moreover, these hydrocarbon $CO_2$-philic groups are substantially less expensive to manufacture and use than fluorinated or silicon compounds.

The $CO_2$-philic compounds and groups of the present invention can be used in a wide variety of applications including, for example, the cleaning industry in which they can be incorporated into surfactants, detergents, fabric softeners and antistatic agents. As chelating agents, they can be used, for example, in metal recovery. The $CO_2$-philic compounds and groups of the present invention can also be incorporated in cleaners used in the electronics industry to, for example, remove oils, greases and other residues from electronic components. The $CO_2$-philic compounds can further be used in dispersants for polymers or inorganic particles (stabilizers), affinity ligands for proteins, catalyst ligands and coatings.

BRIEF DESCRIPTION OF THE DRAWINGS

FIG. 1 illustrates a block diagram of an embodiment of $CO_2$-philic material design of the present invention.

FIG. 2 illustrates a method of synthesizing poly (epichlorohydrin-glycidyl acetate).

FIG. 2 illustrates the phase behavior of the acetate functionalized poly(epichlorohydrin).

FIG. 3 illustrates phase behavior of acetate functionalized epichlorohydrin N25 repeat units (1–33% acetate; 2–40% acetate; 3-PO homopolymer (also 25 repeat units); 4–45% acetate).

FIG. 4 illustrates phase behavior of acetate functionalized poly(epichlorohydrin) (1-Epichlorohydrin homopolymer; 2–28% acetate; 3–100% acetate; 4–33% acetate; 5–38% acetate).

FIG. 5 illustrates phase behavior of functionalized poly (epichlorohydrin) with 33% acetate (1-N=25 repeat units; 2-N=7 repeat units).

FIG. 6 illustrates several embodiment of sterically hindered aluminum catalysts.

DETAILED DESCRIPTION OF the INVENTION

Figure 7:
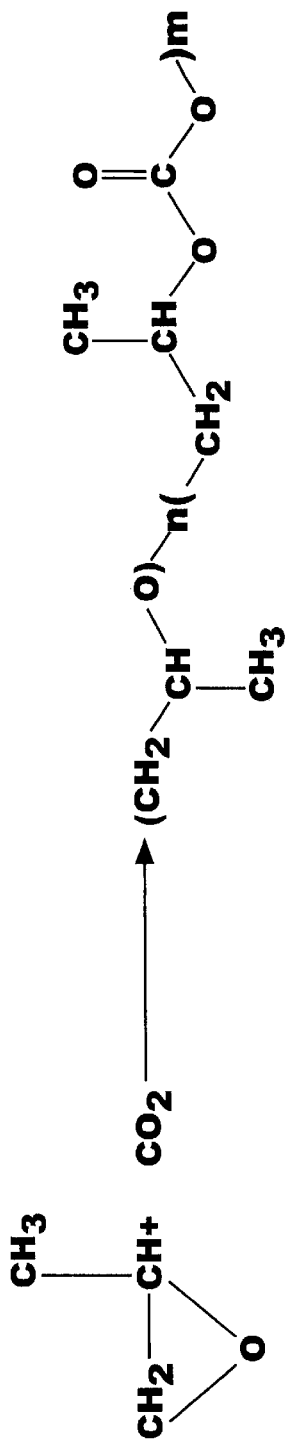
FIG. 7 illustrates synthesis of polycarbonate copolymers from an oxirane such as propylene oxide and carbon dioxide.

As used herein, the term "polymer" refers to a compound having multiple repeat units (or monomer units) and includes the term "oligomer," which is a polymer that has only a few repeat units. The term "copolymer" refers to a polymer including two or more dissimilar repeat units (including terpolymers—comprising three dissimilar repeat units—etc.).

The terms "alkyl", "alkenyl", "aryl", "akylene" and other groups refer generally to both unsubstituted and substituted groups (that is, having one or more hydrogen atoms replaced with one or more substituent groups) unless specified to the contrary. Unless otherwise specified, alkyl groups are hydrocarbon groups and are preferably $C_1$–$C_{10}$ (that is, having 1 to 10 carbon atoms) alkyl groups, and more preferably $C_1$–$C_6$ alkyl groups, and can be branched or unbranched, acyclic or cyclic. Unless otherwise specified, the term "aryl group" refers generally to a phenyl group or to a napthyl group. The term "alkylene group" refers generally to bivalent forms of alkyl groups and can be linear (for example, —$(CH_2)_a$—), branched, acyclic or cyclic (for example, a bivalent form of cyclohexane). Alkylene groups are preferably $C_1$–$C_{10}$ alkylene groups and, more preferably, $C_1$–$C_5$ alkylene groups.

The term "alkenyl" refers to a straight or branched chain hydrocarbon groups with at least one double bond, preferably with 2–10 carbon atoms, and more preferably with 2–6 carbon atoms (for example, —CH=$CHR^4$ or —$CH_2$CH=$CHR^4$, wherein $R^4$ is an alkyl group).

Preferably, the groups of the present invention, if substituted, are substituted with substituent groups that enhance or at least do not substantially negatively effect the CO-philic nature of the CO-philic compound or group. In addition to Lewis base groups, such substituents, include, but are not limited to alkyl groups, alkoxy groups, ether groups, Cl, and alkenyl groups.

As used herein and understood in the art, the term "$CO_2$-philic" preferably refers generally to compounds and groups that are appreciably soluble in or miscible in carbon dioxide, preferably at pressures below approximately 300 atm. More preferably, the compounds and groups are appreciably soluble in or miscible in carbon dioxide at pressures below approximately 200 atm. Most preferably, the compounds and groups are appreciable soluble in or miscible in carbon dioxide at pressures below approximately 125 atm. Likewise, such solubility or miscibility is preferably exhibited at temperatures in the range of approximately 0 to 100° C. (more preferably, in the range of approximately 0 and 50° C.; most preferably, between approximately 0 and 30° C.). As used herein, the term "$CO_2$-phobic" refers generally to compounds and groups that exhibit little solubility or miscibility in carbon dioxide over the pressure and temperature ranges set forth above.

It is difficult to quantify a cutoff point as to whether a particular type of compound is $CO_2$-philic or $CO_2$-phobic as, for example, solubility or miscibility of a particular molecule in $CO_2$ depends (inversely) upon the chain length. In general, under the conditions set forth above, a $CO_2$-philic compound of approximately 25 repeat units preferably has a solubility of at least approximately 2% by weight. More preferably, the compound has a solubility of at least approximately 2% by weight at approximately 100 repeat units. Even more preferably, the compound has a solubility of at least approximately 2% by weight at greater than 200 repeat units.

Design Criteria for Hydrocarbon $CO_2$-philes

In designing a hydrocarbon $CO_2$-phile, the free energy of mixing between the target compound and $CO_2$ must be favorable (that is, negative) at moderate pressures for the material to be considered $CO_2$-philic. Although the entropy and enthalpy of mixing are coupled, one can at first treat the two factors separately by considering only the configurational entropy of mixing (entropic contributions owing to segment-segment interactions can be considered later).

Heuristics to Maximize the Entropy of Mixing

One can choose structures that enhance the entropy of mixing of the $CO_2$-philes of the present invention and $CO_2$ by choosing moieties that permit relatively unfettered rotation, and thus relatively larger number of potential configurations. Although the exact mathematical description of $\Delta S_{mix}$ is still a matter for discussion, previous research on the subject suggests that the entropy of mixing of a chain molecule with a solvent will increase as the flexibility (and hence the number of configurations available) of the chain molecule increases. Decreasing molecular weight is one way to increase the number of available configurations (as a result of effects arising from segment connectivity), but it is also possible to choose molecular structures that exhibit greater inherent chain flexibility. Choosing such structures in the design of the $CO_2$-philes of the present invention will enhance the entropy of mixing, and hence the potential for forming a single-phase mixture with $CO_2$.

A useful gauge of chain flexibility is the steric factor ($\sigma$), as defined in Young, R. J., Introduction to Polymers (1981), Chapman and Hall, Ltd, London, Chapter 3:

$$<r^2>_0 = \sigma n l^2 \{(1-\cos\theta)/(1+\cos\theta)\} \qquad (1)$$

where $<r^2>_0$ is the mean squared end-to-end distance of the unperturbed chain, n is the number of segments, 1 is the segment length, and $\theta$ is the C—C bond angle in the main chain. The steric factor provides the ratio of the actual size of a polymer coil to that which would be measured in the absence of hindrances to free rotation, and is thus a measure of the relative flexibility of a given polymer type. Lower values of the steric factor $\sigma$ suggest higher degrees of flexibility and thus potentially higher entropy of mixing with any solvent. Values of $\sigma$ are tabulated for a number of polymers in Polymer Handbook 3d ed., Brandrup and Immergut, Eds. (1975) Wiley, N.Y.

To optimize the configurational entropy of mixing (at constant chain length) one preferably chooses to incorporate those chemical structures or repeat units that provide for high free volume and high chain flexibility. Increasing specific free volume and chain flexibility decreases the glass transition temperatures ($T_g$). Therefore, low $T_g$ and low steric factor can be used as "markers" to help guide the choice of chemical structure of the $CO_2$-philes of the present invention.

Chain topology (branched vs. linear) can also affect the entropy of mixing in that higher degrees of branching increase the entropy of mixing versus linear analogs of the same number of repeat units. See Kleintjens, L. A.; Koningsveld, R.; Gordon, M.; Macromolecules (1980), 13, 303.

Therefore, to promote high entropy of mixing in the $CO_2$-philes of the present invention, materials with high chain flexibility and free volume (and thus relative low $T_g$ and relatively low $\sigma$ as discussed above) that include branched structures are preferably synthesized.

Effect of $CO_2$-Phile Structure on the Enthalpy of Mixing

It is also desirable to choose structures for inclusion into the $CO_2$-philes of the present invention that will enhance solute-solvent interactions while not increasing the strength of solute-solute (or solvent-solvent) interactions to the point where dissolution in $CO_2$ is prevented.

Materials with relatively weak self-interaction will tend to exhibit low cohesive energy density, and hence low values of both the interfacial tension and solubility parameter. Favorable cross interactions can also play a significant role in determining the phase behavior of polymers in $CO_2$. Specific interactions in $CO_2$-solute systems can, for example, be of the dipole-quadropole variety, or also Lewis acid/Lewis base, given that $CO_2$ is a known Lewis acid. The importance of favorable cross-interactions decreases as the temperature is raised.

In light of the above, to optimize the enthalpy of mixing, one preferably begins with a base material having a low cohesive energy density to minimize the impact of solute-solute interactions (this base material should also exhibit a low $T_g$ and steric factor, as indicated in the previous section). However, functional groups that interact favorably with $CO_2$ (preferably, Lewis bases) are preferably added to enhance cross interactions.

Given the criteria developed above through entropic and enthalpic considerations, the $CO_2$-philic hydrocarbons of the present invention are preferably synthesized as a copolymer wherein:

1. At least one of the monomers/repeat units preferably provides high flexibility and high free volume, as evidenced by low $T_g$ and low steric parameter, to enhance the entropy of mixing, and also a low cohesive energy density, to minimize the impact of solute-solute interactions. In that regard, a polymer formed from polymerization of such a monomer preferably has a $T_g$ of less than approximately 250 K. More preferably, the $T_g$ is less than approximately 200 K. The steric factor of a polymer formed from polymerization of such a monomer is preferably less than approximately 1.8. More preferably, the steric factor is less than approximately 1.5. Most preferably, the steric factor is less than approximately 1.3.
2. At least one of the monomers/repeat units preferably contains a group or groups that are known to interact specifically with $CO_2$ (for example, Lewis bases), yet the resultant $CO_2$-phile preferably does not contain both hydrogen bond donors and acceptors. The presence of both hydrogen bond donors and acceptors will tend to lower flexibility, and inflate both $T_g$ and the cohesive energy density.
3. The functional groups described in (2) above are preferably separated from the polymer backbone by 1 or 2 atom spacer when present in a side chain.

Use of a flexible chain (1) with a branched architecture (3) ensures that the entropy of mixing will be as high as possible. Further, choosing a base material with a low cohesive energy density reduces the strength of solute-solute interactions, and thus favors mixing. Finally, inclusion of functional groups (preferably, Lewis bases) that interact favorably (albeit weakly) with $CO_2$ produce favorable solute-$CO_2$ interactions, and thus enhance the enthalpy of mixing. However, adding such groups will likely also raise the cohesive energy density, and thus the optimal number of such groups is such that the two effects are preferably balanced.

A copolymer including two monomers exhibiting the above criteria is represented graphically in FIG. 1.

(A) In FIG. 1, Monomer 1 ($M_1$), contributes to high flexibility, high free volume, and weak solute/solute interactions (low cohesive energy density or interfacial tension). As described above, low $T_g$ and steric parameter are generally used as evidence for high flexibility and free volume in polymeric materials. These factors combine to create a favorable entropy of mixing for the copolymer in $CO_2$, as well as weak solute-solute interactions, easing dissolution into $CO_2$.

(B) Monomer 2 ($M_2$), produces specific solute/solvent interactions between the polymer and $CO_2$, through a group with affinity for carbon dioxide such as a Lewis base group (for example, a carbonyl group) in a side chain or in the backbone of the polymer.

Ideally, interactions between $M_1$ and $M_2$ should be enthalpically unfavorable, further helping to promote dissolution in carbon dioxide. It is possible that this feature is a strong contributor to the low miscibility pressures of fluoroacrylate polymers in $CO_2$, in that interactions between the fluorinated side chains and acrylate backbone of this material are likely to be unfavorable. Because use of a homopolymer of either $M_1$ or $M_2$ only serves to optimize part of the free energy, if both monomer 1 and monomer 2 are chosen in the proper proportions the copolymer will be more soluble than either of the homopolymers.

In addition to the location of the phase boundaries in P-x space, the effect of temperature on miscibility pressure is also of importance. If increasing temperature raises the miscibility pressure (LCST type behavior) for a particular $CO_2$-phile, increasing chain flexibility (through alterations to copolymer composition) may favorably impact phase behavior. On the other hand, if UCST behavior is observed (decreasing miscibility pressure as temperature increases), then increasing the concentration of functional groups that interact with $CO_2$ is recommended.

The present inventors have discovered that adherence to the criteria set forth above in designing $CO_2$-philes, enables synthesis of $CO_2$-philes that are strongly $CO_2$-philic without the necessity of incorporating fluorine or silicon atoms. Monomers that produce polymers (and that preferably do not contain fluorine or silicon) with low cohesive energy density and low $T_g$ include, for example, alpha olefins (for example, ethylene and/or propylene), dienes (for example, butadiene and/or isoprene), and various cyclic ethers. Functional groups that are likely to interact favorably with $CO_2$ include Lewis bases such as carbonyls, tertiary amines, and phosphonyls.

Some of the above-identified monomeric base materials (for example, polyethylene and polybutadiene) can readily crystallize in certain forms in which chain packing is straightforward. Crystallization is not desirable in the $CO_2$-philes of the present invention because the operating temperature (and thus the pressure) required to form a single phase solution in $CO_2$ will be elevated (to melt the material), increasing the cost of a potential processes. Fortunately, incorporation of a comonomer (preferably in an atactic fashion) reduces order in the molecule and thereby reduces the potential to pack and crystallize.

The entropy of mixing drops as the chain length of the solute increases. Preferably, the total chain length of the $CO_2$-philic group is less than approximately 400 repeat units. More preferably, the total chain length of the $CO_2$-philic group is less than approximately 200 repeat units. For many application (for example, surfactants) the total chain length is preferably between 5 and 50 repeat units. More preferably, the chain length in such applications is between approximately 20 to 40 repeat units.

Although the entropy and enthalpy of mixing have been treated separately in the present analysis, it is clear that they are inextricably linked. As the number specific interactions ($CO_2$-solute) increases, the enthalpy of mixing may become more favorable but the entropy of mixing will decrease. Increasing the number of comonomers with Lewis base groups in the chain (either in the backbone or pendant) can hinder rotation about the chain, also reducing the entropy of mixing. Likewise, substitutions or side groups other than Lewis base groups on the comonomers can also hinder rotation.

Finally, as mentioned above, increasing the number of Lewis base functional groups will also raise the cohesive energy density, and thus a point may be reached where further incorporation of such groups is an enthalpic detrement, rather than an advantage. In the $CO_2$-philes of the present invention, the preferred number of functionalized comonomers (much like a "bound" co-solvent) per chain is that which provides a suitable balance between enthalpy gain through favorable cross-interactions, enthalpy loss from increased solute cohesive energy density, and entropy loss and is readily determined experimentally.

MODEL STUDIES WITH CARBONYL-FUNCTIONAL POLY(DIMETHYL SILOXANE)

The effect of side chain functionalization with Lewis bases on the $CO_2$ phase behavior of a model silicone $CO_2$-phile was studied. Silicones are considered $CO_2$-philic, although not as strongly $CO_2$-philic as fluorinated ethers and fluorintated acrylates. It was observed that silicones exhibit UCST type behavior (as temperature increases, the pressure required to solubilize a given amount of material drops), which suggested that the enthalpy of mixing of these materials with $CO_2$ might be improved through the incorporation of Lewis bases in side chains. Silicones exhibit amongst the lowest $T_g$ (150K) and steric parameter (1.39) observed in synthetic polymers, and hence it would appear that chain flexibility (and thus the entropy of mixing) is not an area requiring extensive improvement.

Functionalized silicones were prepared via the hydrosilation of model dimethyl siloxane-hydromethyl siloxane oligomers (25 repeat units total, with 1, 2, or 5 hydromethyl groups per chain, received from Gelest, Inc.) over a platinum catalyst. Allyl acetate or 1 hexene were used to generate the side chains, to allow comparison of the efficacy of adding Lewis base groups to adding simply methylene units. The carbonyl group was thus separated from the main chain by a propyl spacer.

The phase behavior of the model $CO_2$-philes was measured as described previously in Hoefling, T. A.; Newman, D. A.; Enick, R. M.; Beckman, E. J.; J. Supercrit. Fl. (1993), 6, 165, using a variable volume high-pressure view cell. Phase behavior results were quite dramatic, in that addition of five acetate functional side chains to the silicone oligomer lowered the cloud point curve by over 2500 psi at room temperature. Addition of simple alkyl side chains raised the cloud point curves to higher pressures. Finally, the magnitude of the change in the location of the cloud point curve was found to be proportional to the number of side chains.

This model study confirmed that addition of Lewis base groups in side chains removed from the polymer backbone of a known silicon-containing $CO_2$-philic compound renders the material "more $CO_2$-philic." Subsequently, studies were performed upon hydrocarbons that did not contain F or Si to determine whether addition of Lewis base groups would improve or establish $CO_2$-philic nature in such compounds.

FUNCTIONALIZED POLYETHER COPOLYMERS

Polyethers are known to exhibit low $T_g$'s (typically, in the range of approximately 190 to approximately 230 K) and relatively low cohesive energy densities. Previous studies have shown that polyethers are more "$CO_2$-philic" than many other common polymers, yet significantly less so than fluorinated polymers or silicones. The present studies explored the effect of side chain functionalization with Lewis bases (for example, a functional group comprising a carbonyl group) on the phase behavior of model polyethers in $CO_2$. Carbonyls have been shown to interact favorably with carbon dioxide. The effect of C=O placement in polyethers, as well as the effect of the extent of functionalization with carbonyl groups were studied. The phase behavior of a homopolymer of propylene oxide (PO) with the same number of repeat units was used as a baseline for comparison.

Lewis base functionalized PO (and/or, for example ethylene oxide (EO)) copolymers may, for example, be generated via copolymerization of either of the two oxiranes with the acetate-functional analog synthesized from glycidol and acryloyl chloride. It has also been shown previously that tertiary amines interact favorably with $CO_2$ via an acid-base mechanism. Reaction between an epichlorohydrin homo- or copolymer and a dialkyl amine will produce a tertiary amine-functional polyether. One can, for example, synthesize a compound with pendant phosphonyl groups via reaction of glycidol with chloro (diethyl) phosphonate, followed by copolymerization of the new monomer with, for example, propylene oxide.

In one study, epichlorohydrin was polymerized using boron trifluoride etherate at temperatures below 0° C., and characterized via GPC. Acetate-functional derivatives (see FIG. 2) were then prepared via reaction of potassium acetate with the epichlorohydrin polymer in the presence of a phase transfer catalyst. Phase behavior presented in FIG. 3 shows that addition of acetate groups lowers the cloud point pressures considerably.

The Effect of Side Chain Functionalization on Solubility

A homopolymer of epichlorohydrin (25 repeat units) exhibits cloud point pressures above the limits of the instrument used (400 atmospheres, or 6000 psi) for concentrations greater than 0.5 weight %. As one can see from FIG. 3, although the homopolymer of epichlorohydrin is insoluble at the operating conditions, the acetate modified polymers are soluble in $CO_2$, and their cloud point pressures decrease as the amount of acetate is increased. Thus, a polymer modified with 45% acetate exhibits lower cloud point pressures than a homopolymer of propylene oxide of the same chain length.

A lower molecular weight (seven repeat units) poly (epichlorohydrin) was also modified with different amounts of acetate groups, and their solubilities compared (FIG. 4). The cloud points dropped by 100 atm as the percent acetate incorporated into the polymer increased from 28 to 38%, yet the cloud point pressures of a 100% acetate were higher. It is believed that the acetate groups act like a bound cosolvent. However, as the amount of acetate increased a point of diminishing returns was reached. Although increasing the amount of acetate enhances $CO_2$-polymer interactions, it also stiffens the chain and likely enhances polymer-polymer interactions as well. Comparing poly(epichlorohydrin) with 7 and 25 repeat units (FIG. 5) with the same amount of acetate (33%), it was seen that the cloud points of the two differed by as much as 70 atm, as expected.

POLYETHER/POLYCARBONATES COPOLYMERS

It was believed that incorporation of the Lewis bases such as carbonyl groups into side chains would be the most productive route to increase miscibility or solubility in $CO_2$, as a result of enhancement of both the enthalpy and entropy of mixing. Nevertheless, the incorporation of carbonyls into the polymer backbone via copolymerization of $CO_2$ itself with propylene oxide (PO), cyclohexene oxide (CHO) and ethylene oxide (EO). Sterically hindered alkoxy aluminum catalysts (examples of which are illustrated in FIG. 6) were identified that copolymerize propylene oxide and other cyclic ethers with $CO_2$ at much higher efficiencies (greater than 200 grams of polymer per gram of aluminum) than has previously been reported. These catalysts are living in character (yields in the range of 200–1200 g polymer/g catalyst) with one type of site available for polymerization, and can be monofunctional or difunctional. The extent to which $CO_2$ is incorporated into the polymer depends on the temperature and pressure at which the polymerization is carried out, as well as on the nature of sterically hindered substituents attached to the aluminum atoms and on the oxirane type.

Using the sterically hindered alkoxy aluminum catalysts, a series of PO/$CO_2$ copolymers were synthesized as illustrated in FIG. 7. In a typical experiment, aluminum chloride was reacted with first, propylene glycol, then 2,6 di-isobutyl, 4-methyl phenol at 0° C. under argon to generate the catalyst. The catalyst was characterized via $^1H$ and $^{27}Al$ NMR. Other sterically hindered aluminum catalysts were prepared similarly by changing the nature of the alcohols. Copolymerizations were conducted between $CO_2$ and, for example, ethylene oxide (EO), propylene oxide (PO), and cyclohexene oxide (CHO) at temperatures between 5° C. and 60° C. (depending upon oxirane type) and pressure between 800 and 2500 psi, for times up to 24 hours. The molecular weight was controlled via the ratio of oxirane to catalyst. Typically, catalyst was charged to a stainless steel 50 cc reactor under argon, followed by $CO_2$ at its vapor pressure. The oxirane was then charged using a manual syringe pump, and the pressure and temperature brought to their desired points. At a pre-designated time, the polymerization was quenched with acidic methanol, and the residual oxirane was removed under vacuum. Furthermore, these types of copolymers can also be formed by the reaction of phosgene and diols.

Phase behavior studies in $CO_2$ indicated that copolymerization of $CO_2$ and oxiranes produce $CO_2$-philic hydrocarbons. Only a small percentage of carbonate repeat units was needed to produce a $CO_2$-philic material. Further, choice of the correct percentage of carbonate repeat units lead to phase behavior that is superior to either of the homopolymers.

Figure 8:
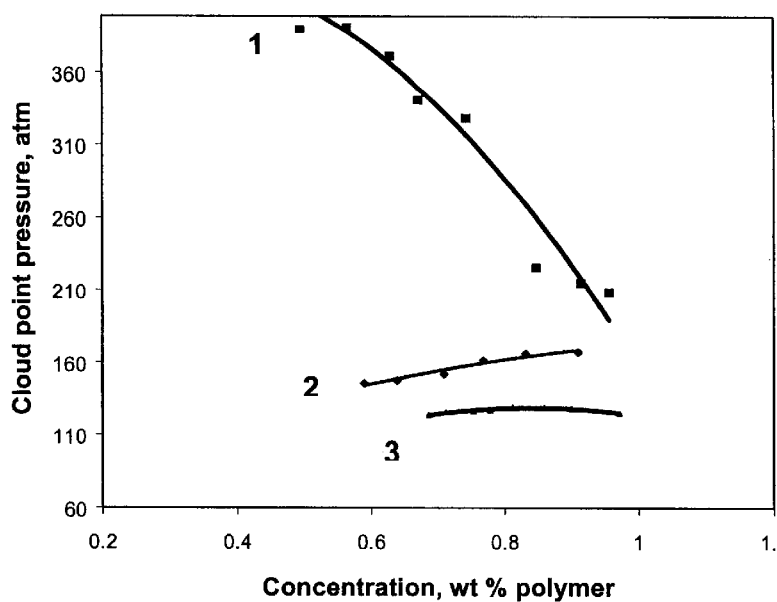
FIG. 8 illustrates the phase behavior propylene oxide-carbon dioxide ($PO/CO_2$) polycarbonate copolymers with N=25 repeat units (1-$PO/CO_2$ copolymer with 56% carbonate; 2-PO homomopolymer; 3-$PO/CO_2$ copolymer with 40% carbonate).

Comparing PO/$CO_2$ copolymers with 25 repeat units (FIG. 8) one can see that a copolymer with 56% carbonate is less $CO_2$-philic than a homopolymer of PO, but a polymer with 40% carbonate exhibits miscibility pressures lower than those of the homopolymer. A polycarbonate homopolymer (that is, a completely alternating $CO_2$/propylene copolymer) with 25 repeat displays miscibility pressures beyond the limits (6000 psi) of the instrument used. These results are consistent with the design hypothesis of FIG. 1, that if the certain proportions of monomer 1 and monomer 2 as described in the above criteria are chosen, the copolymer will be more soluble than either of the homopolymers.

Figure 9:
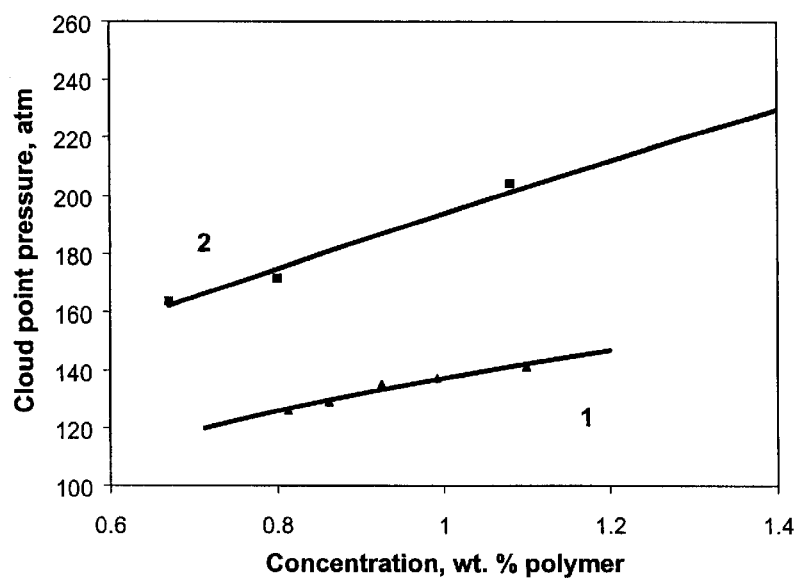
FIG. 9 illustrates the phase behavior propylene oxide-carbon dioxide polycarbonate copolymers compared to the phase behavior of a fluororether (1-$PO/CO_2$ copolymer with N=220 repeat units and 15% carbonate; 2-Krytox (available from Dupont) with N=176 repeat units).

Indeed, PO/$CO_2$ copolymers are apparently more $CO_2$-philic than fluoroether polymers, in that the cloud points of a 250 repeat unit PO/$CO_2$ copolymer (15.4% carbonate) were significantly lower than those for a poly (perfluoroether) (Krytox™ available from DuPont) with 175 repeat units (FIG. 9). This behavior is quite dramatic since poly(perfluoroethers) are one of the most $CO_2$-philic polymers known to date, and the PO/$CO_2$ copolymers are likely to be at least 1/100 the cost of the fluorinated materials.

Figure 10:
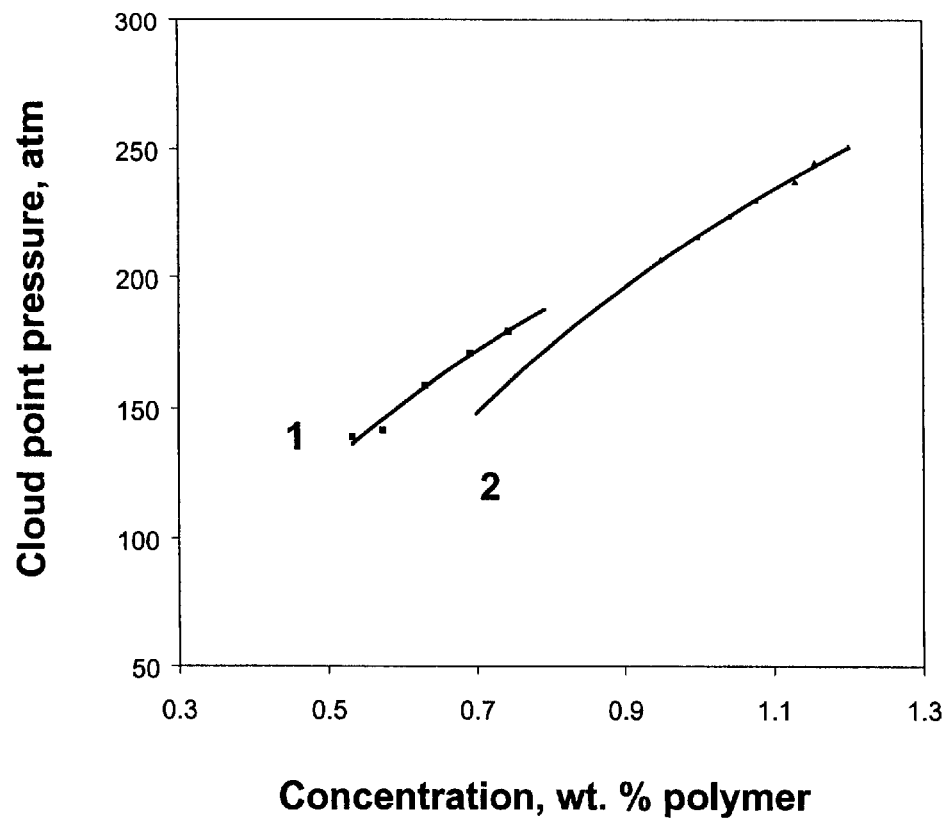
FIG. 10 illustrates the phase behavior or an ethylene oxide-carbon dioxide ($EO/CO_2$) polycarbonate copolymer compared to polyethylene oxide homopolymer (PEO) (1-$EO/CO_2$ copolymer with N=103 repeat units and 33.7% carbonate; 2-PEO with N=16).

The phase behavior of other oxirane/$CO_2$ copolymers was also examined. Ethylene oxide (EO) was copolymerized with carbon dioxide. It was found that an EO/$CO_2$ copolymer with 103 repeat units had almost the same phase behavior (FIG. 10) as a homopolymer of EO with only 16 repeat units (a EO homopolymer with 103 would be essentially insoluble in this pressure range).

Figure 11:
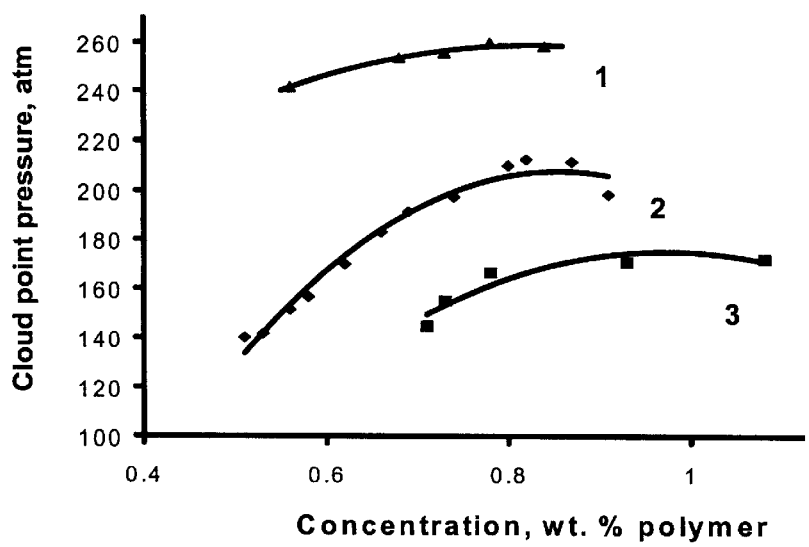
FIG. 11 illustrates the phase behavior cyclohexene oxide-carbon dioxide ($CHO/CO_2$) polycarbonate copolymers (1–47% carbonate with N=27; 2–40% carbonate with N=20; 3–50% carbonate with N=16).
Figure 12:
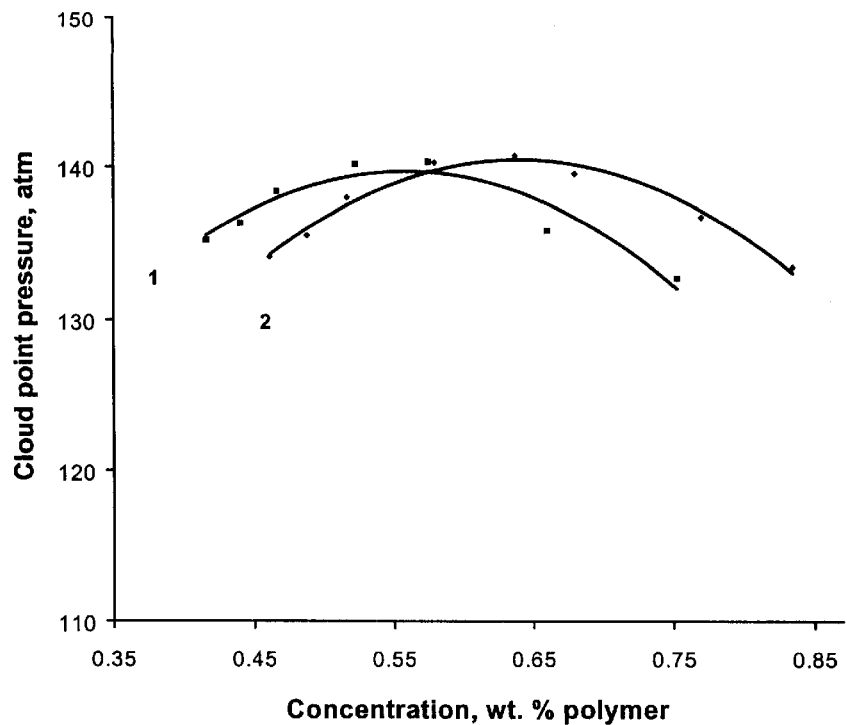
FIG. 12 illustrates phase behavior cyclohexene oxide-carbon dioxide polycarbonate copolymers with low content of carbonate units (1–8.8% carbonate with N=124; 2–2.3% carbonate with N=88).

Copolymers of cyclohexene oxide and $CO_2$ were also synthesized. One might expect that the chain would be less flexible as a result of the cyclohexane rings. Miscibility pressures for these types of copolymers (as for others) are a function of molecular weight and of incorporated carbon dioxide (as carbonate units). For example, the data in FIG. 11 show that miscibility pressures increase upon increasing chain length at (relatively) constant % of carbonate, as expected. However, as shown in FIG. 12, the amount of carbonate required to render these copolymers "$CO_2$-philic" was apparently much lower than the levels in the materials in FIG. 11. FIG. 12 shows that copolymers with less than 10% carbonate repeats exhibited miscibility pressures below 150 atmospheres. The cloud point curves for CHO—$CO_2$ copolymers with N=124 repeat units (8.8% carbonate) and N=88 repeat units (2.3% carbonate) showed almost the same behavior despite being different by 36 repeat units. That the CHO/$CO_2$ copolymers are so $CO_2$-philic is somewhat surprising. The data in FIG. 12 may be a result of increased chain flexibility upon introduction of carbonate repeats into a poly(CHO) or to unfavorable enthalpic interactions between carbonate and cyclohexyl groups.

Figure 13:
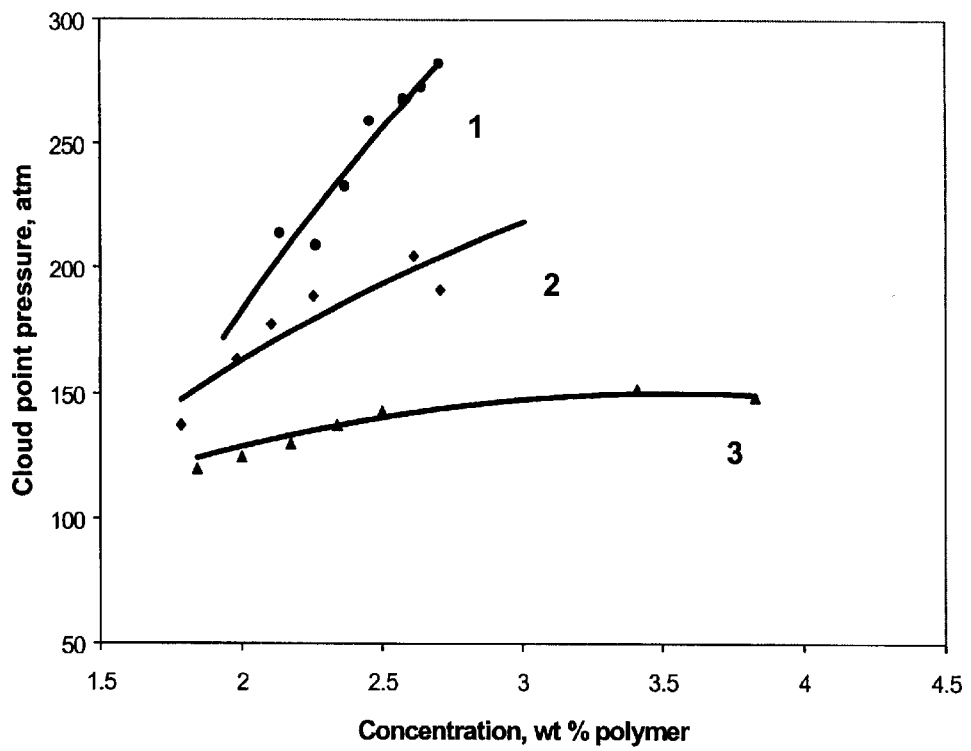
FIG. 13 illustrates phase behavior of poly(propylene glycol) diol (1), poly(propylene glycol) monobutyl ether (2) and poly(propylene glycol) acteate (3) with 21 repeat units.

It should be also noted that the solubility of low molecular weight polymers in carbon dioxide is affected by the nature of the end groups. It was observed that mono hydroxy terminated polyethers are more soluble than a difunctional homologue with the same number of repeat units, but less soluble than an acetoxy terminated polyether (FIG. 13). Again, addition of an acetate group provides a superior response to addition of an alkyl group.

The phase behavior of these materials illustrates that hydrocarbons can indeed be strongly $CO_2$-philic without F or Si atoms incorporated therein. Furthermore, by incorporating the carbonyl group in the main chain, these materials are biodegradable as well as $CO_2$-philic.

Figure 14:
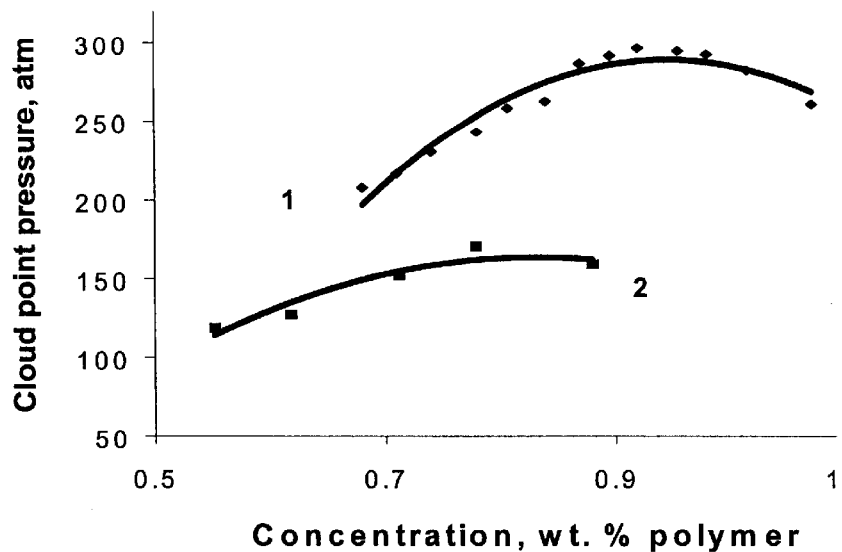
FIG. 14 illustrates phase behavior of epichlorohydrin/$CO_2$ copolymer compared to acetate modified poly (epichlorohydrin) (1-ECH/$CO_2$ copolymer with N=17 and 25% carbonate; 2-Modified poly(epichlorohydrin) (PECH) with N=25 and 45% acetate).

The above studies demonstrate that the solubility of polyethers in $CO_2$ is dramatically affected either by addition of acetate groups in the side chain or carbonate groups in the backbone of the polymer. Miscibility pressures of polyethers modified with acetate groups decrease as the acetate contents increases, yet a point is reached where additional acetate content raises cloud point pressures. These observations are consistent with the general criteria set forth above. The oxirane/$CO_2$ copolymers were very soluble even to the point where a PO/$CO_2$ copolymer was more soluble than a poly(perfluoroether). It remains unclear, however, if it better to put carbonyl groups in the side chain or the backbone. FIG. 14 shows that a copolymer of epichlorohydrin and $CO_2$ with 17 repeat units and 25% carbonate was less soluble than a poly(epichlorohydrin) with 25 repeat units modified with 45% acetate groups. However it is not known if 25% is the optimum level of carbonate linkages in the ECH/$CO_2$ copolymer for maximum solubility (or if 45% acetate is also optimal) . In general, there is preferably a balance between the favorable entropic effects from chain flexibility and the enthalpic effects created by solute/solvent interactions.

$CO_2$-PHILIC VINYL POLYMERS

The polyethers and polyether/polycarbonate copolymers described above are synthesized from commodity raw materials (for example, $CO_2$ and oxiranes) and are hence far less expensive than fluorinated $CO_2$-philes. However, the polymerization mode (coordinative ring opening) does not always lend itself to easy generation of functionalized polymers. Hydrocarbons generated from simple vinyl monomers may also be polymerized from inexpensive reagents and generally are readily functionalized with a wide range of functional groups.

The criteria established in the present invention for $CO_2$-philes indicates that copolymers based on either ethylene or propylene will provide good candidates for $CO_2$-philic hydrocarbons as polymers formed from each of these monomers exhibit very low $T_g$ and low cohesive energy density. Each of these monomers may present some synthetic difficulties, however. Free-radical copolymerization of ethylene with functional monomers (such as vinyl acetate), wherein the functional monomer is in the minority (40 mole % and below), can only occur at extreme conditions (for example, 2000 bar, and above 200° C.). Burkhart, R. D.; Zutty, N. L.; J. Polym. Sci., Part A (1963), 1, 1137. Unfortunately, Ziegler-type catalysts that operate under mild conditions do not copolymerize polar monomers with ethylene or propylene (see, Odian, G.; Principles of Polymerization, $3^{rd}$ Edition (1991), John Wiley & Sons, New York, Section 8-4d.). One can "mask" the polar group, however, allowing copolymerization. Xie, H-Q.; Baker, W. E.; Arshady, R.; in Desk Reference of Functional Polymers; Synthesis and Applications, Arshady, R., editor (1997), Amer. Chem. Soc., Washington, D.C., 133. Propylene is also somewhat problematic, in that it can only be copolymerized (other than with Ziegler style catalysts, which will not function with polar monomers) cationically, possibly limiting one to vinyl ethers as potential comonomers in that reaction scheme.

Nickel di-imine catalysts as known in the art may be suitable to copolymerize ethylene or propylene and vinyl acetate (for example) under mild conditions and somewhat elevated pressures.

Butadiene also presents a promising base material/monomer for the vinyl $CO_2$-philes of the present invention. In that regard, polybutadiene exhibits a very low $T_g$, and also a cohesive energy density lower than that of polypropylene oxide. Butadiene is inexpensive and can be copolymerized with a variety of vinyl monomers using free-radical initiators, easing the synthesis of $CO_2$-philic oligomers. Free-radical polymerization of butadiene also creates repeat units of both the 1,2 and 1,4 types, which distribution desirably tends to eliminate the potential of crystallization and raise free volume.

Copolymerizations of butadiene and comonomers may be conducted free-radically in solvent using butyl mercaptan to limit the molecular weight to the desired number of total repeat units (GPC, Waters 150 CV may be used to ascertain molecular weight).

Side chains with the various functional groups of interest (preferably, Lewis bases) may be generated using the strategy outlined below. Generation of carbonyl-containing ester-functional side chains with a 1 or 2 atom spacer, for example, is relatively straightforward. Vinyl acetate may be copolymerized with butadiene to generate the ester-functional side chain with a 1-atom spacer. The mole % of the comonomer is relatively easy to manipulate and to ascertain (via $^1H$ NMR). Generation of the analog with a 2-atom spacer is readily accomplished via (a) free-radical copolymerization of butadiene with acrolein, followed by (b) reduction of the aldehyde side chains to $CH_2OH$, and then (c) reaction of the hydroxyl group with acetoyl chloride. Given the low molecular weight of the precursor oligomers and the innate high yield of the proposed reactions, near quantitative conversion of the original aldehyde side groups to acetate may be accomplished. Characterization may be performed using $^1H$ NMR (tracking the signals resulting from the C(O)—H proton, the $CH_2$—O protons, and ultimately those of the ester group). FT-IR can be used to qualitatively follow the change from aldehyde to alcohol to ester.

Analogs with phosphonyl groups as side chains are readily prepared via (a) base-catalyzed hydrolysis of the vinyl acetate/butadiene copolymer described above, followed by (b) reaction with chloro-diethyl phosphonate (Aldrich) with a base catalyst to generate the analog with a 1-atom spacer. An analog with a 2-atom spacer is prepared, for example, via a reduced acrolein copolymer discussed above, followed again by reaction with the chloro diethyl phosphonate. By employing common precursors for both the carbonyl and phosphonyl analogs, one can eliminate molecular weight and compositional distributions as variables in the phase behavior analysis. As in the case of the carbonyl variants, the proposed reactions can proceed to near quantitative yield, and are easily followed using $^1H$ and $^{31}P$ NMR.

A number of viable routes are available for the preparation of a tertiary amine-containing oligomer with, for example, a 1-atom spacer. For example, the reduced acrolein copolymer described above (with side chains of —$CH_2$—OH) can be tresylated, then reacted with dimethyl amine to form the required model $CO_2$-phile. As discussed above, this route is advantageous because it eliminates effects arising from variances in molecular weight and composition distribution (through use of common precursors). A simpler method, however, involves (a) copolymerization of butadiene with N,N dimethyl acrylamide, followed by (b) reduction of the amide groups to, fro example, $CH_2$—$N(CH_3)_2$ using lithium aluminum hydride. As before, such a reaction on a low molecular weight, highly soluble oligomer may be nearly quantitative. The extent of the reduction is readily followed via $^1H$ NMR or FT-IR.

Figure 15:
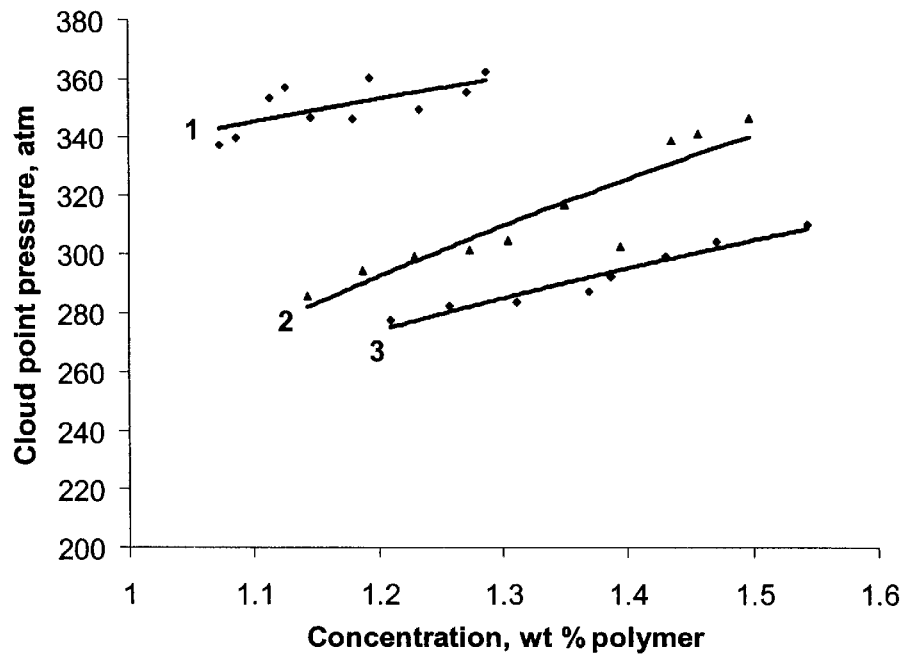
FIG. 15 illustrates phase behavior of vinyl acetate and ethyl vinyl ether homopolymers (1-poly(vinyl acetate) with 90 repeat units; 2-Poly(ethyl vinyl ether) with 20 repeat units; 3-poly(vinyl acetate) with 70 repeat units).

In several studies of the present invention, copolymers of vinyl acetate (VA) and ethyl vinyl ether (EVE) with varying chain length and vinyl acetate composition were prepared free radically. These monomers were chosen, in part, for ease of synthesis. The amount of vinyl acetate incorporated depended on the initial amount of vinyl acetate that was used to charge the reactor, while chain length was a function of the amounts of initiator and chain transfer agent employed. Characterization was done using 1H NMR from the peaks at 5.03 (—CH from vinyl acetate) and 3.43 (—$CH_3$ from ethyl vinyl ether). The solubility of the polymers in liquid $CO_2$ was studied at 22° C. Ethyl vinyl ether is a synthetically tractable yet non-ideal choice for monomer 1, as it exhibits a higher $T_g$ (~230K) and cohesive energy density than optimally desired. This is shown clearly in FIG. 15, wherein a homopolymer of ethyl vinyl ether of only 20 repeat units exhibited miscibility pressures above 260 bar for concentrations above 1 weight percent. By contrast, a 25 repeat-unit homopolymer of propylene oxide exhibited miscibility pressures well below 200 bar, and homopolymers of vinyl acetate of significantly longer chains lengths exhibited miscibility pressures in the same general pressure range (FIG. 15). Nevertheless, the use of EVE was instructive in the pursuit of the design of non-fluorous $CO_2$-philes via balancing the contributions of monomer 1 and monomer 2.

Figure 16:
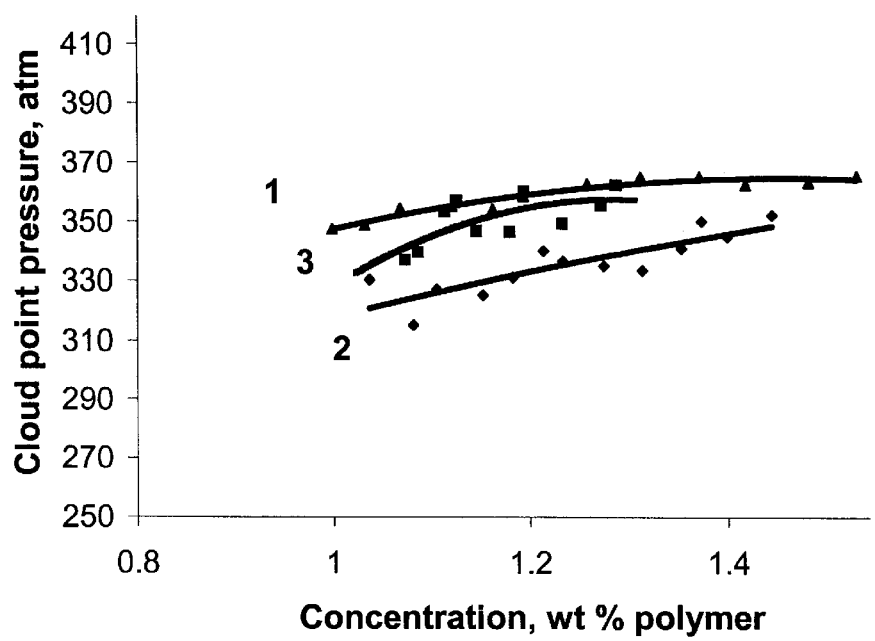
FIG. 16 illustrates phase behavior of vinyl acetate/ethyl vinyl ether copolymers and vinyl acteate homopolymer with 90 repeat units (1–39.8% vinyl acetate (VA); 2–22.4% VA; 3-VA homopolymer).
Figure 17:
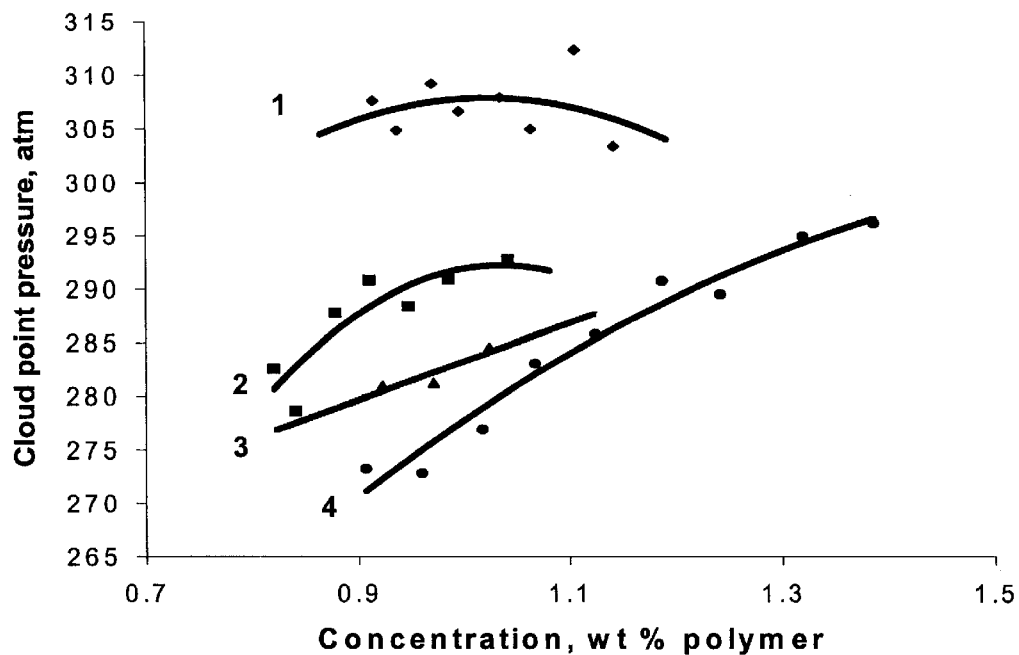
FIG. 17 illustrates phase behavior of vinyl acetate/ethyl vinyl ether copolymers and vinyl acetate homopolymer with 70 repeat units (1–67% VA; 2–63% VA; 4-VA homopolymer; 4–18.47% VA.)
Figure 18:
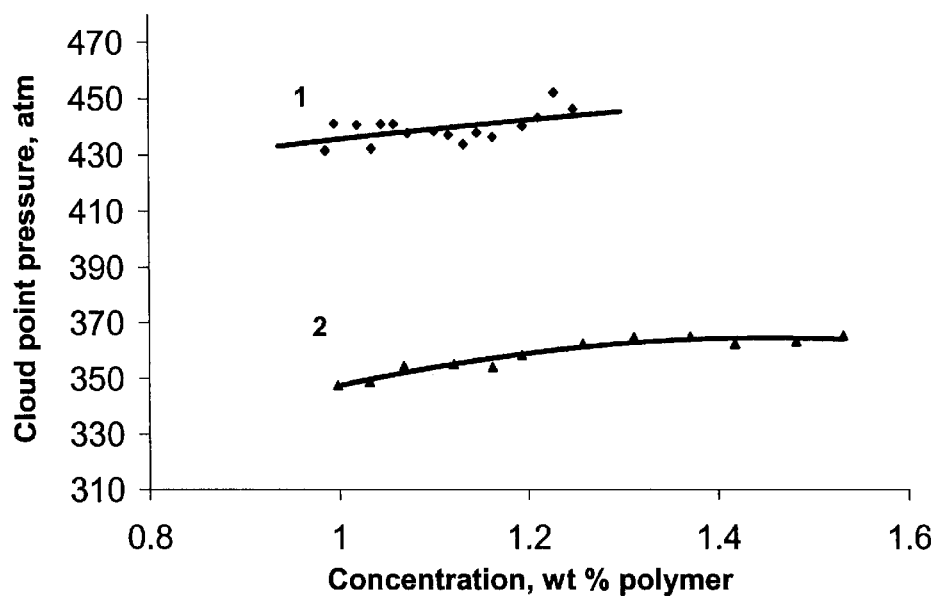
FIG. 18 illustrates phase behavior of vinyl acetate/ethyl vinyl ether copolymers (1–135 repeat units and 46.6% VA; 2–90 repeat units and 39.8% VA).

FIG. 16 shows the phase behavior of copolymers of EVE and vinyl acetate wherein the total chain length of the copolymers was 70 (+/−5) repeats. As hypothesized, adjustment of vinyl acetate (monomer 2 in the scheme of FIG. 1) content allowed for lower miscibility pressures of the copolymer than either of the homopolymers (note that cloud point pressures for a homopolymer of EVE of 70 repeats are above the pressure limits of the equipment). This trend was repeated for chains of 90 repeats (+/−5), as shown in FIG. 17. From the data in FIGS. 16 and 17, it can be estimated that a vinyl acetate content of 25–30% will provide the lowest miscibility pressures for this class of copolymer. Unfortunately, it is difficult to a priori predict the optimal monomer 2 (in this case vinyl acetate) content of the copolymer. The above studies of ether-carbonate copolymers, illustrate that the ideal carbonate content varied significantly as the type of oxirane varied from ethylene oxide to propylene oxide to cyclohexene oxide. At relatively constant vinyl acetate content, changing molecular weight produces the expected effect (FIG. 18), wherein increasing chain length increased miscibility pressures.

The results for vinyl copolymers can be greatly improved (that is, lower miscibility pressures observed) in copolymers wherein the $T_g$ and cohesive energy density of polymers of monomer 1 were lower than that of poly(ethyl vinyl ether). For example, either butadiene or isobutylene are effective choices for monomer 1.

$CO_2$-PHILIC POLY (ETHER-ESTERS)

Poly(ether-ester) copolymers of the present invention can be synthesized by reacting, for example, a dihydroxy polyalkylene oxide (a polyether with a hydroxy group at each end) with a di-acid, a di-alkyl ester, or a di-acid halide at elevated temperature (generally, above 65° C., but below 200° C.), using vacuum to remove the byproduct (water or alcohol). Alternatively, a base can be added in the case of the di-acid halide (byproduct is HCl). These synthetic techniques and others for synthesizing the poly(ether-ester) copolymers of the present invention are well known to those skilled in the art. Like the poly(ether-carbonate) groups discussed above, the poly(ether-ester) copolymers of the present invention include a Lewis base (carbonyl group) in the copolymer backbone.

SYNTHESIS OF $CO_2$-PHILIC ANALOGS

In general, compounds not soluble or miscible in $CO_2$ (that is, $CO_2$-phobic compounds) can be made more soluble or miscible in $CO_2$ by synthesizing "$CO_2$-philic analogs" of such compounds incorporating one or more $CO_2$-philic groups. Processes and reactions that are normally not possible in $CO_2$, are thereby made possible. For example, surfactants, chelating agents and reactants for use in carbon dioxide can be synthesized in this manner. See, for example, U.S. patent application Ser. No. 09/106,480; U.S. Pat. No. 5,641,887; and U.S. Pat. No. 5,872,257.

Figure 19:
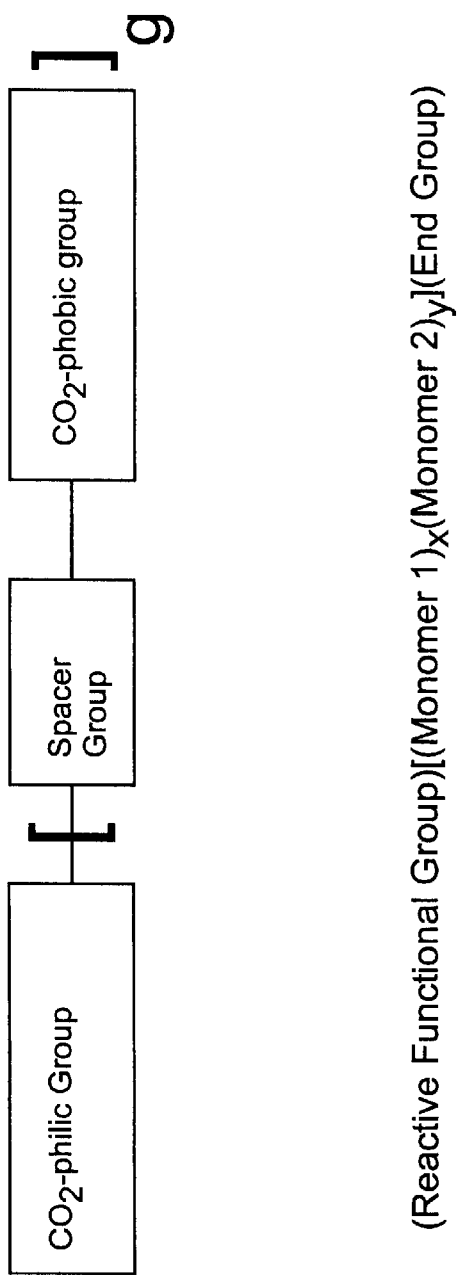
FIG. 19 illustrates the general design of an analog of a $CO_2$-phobic compound that is made miscible or soluble in $CO_2$ by incorporation of one or more $CO_2$-philic groups.

FIG. 19 sets forth a general formula for such compounds. As illustrated in FIG. 19, $CO_2$-philic analogs of $CO_2$-phobic compounds include generally a $CO_2$-phobic group corresponding to the underlying $CO_2$-phobic compound and a $CO_2$-philic segment including at least one $CO_2$-philic group (g is an integer of at least one in FIG. 19). The $CO_2$-phobic group and the $CO_2$-philic group(s) are preferably covalently attached via a spacer or connector group. As known from previous work with fluorinated and silicon $CO_2$-philes, the compounds of FIG. 19 can be prepared from the $CO_2$-philes of the present invention by preferably synthesizing such $CO_2$-philes with a reactive terminal functionality or reactive functional group such as a hydroxyl group. This terminal functional group of the $CO_2$-phile is preferably reactive with a functional group on the $CO_2$-phobic compound. The reaction between the terminal functional groups of the $CO_2$-phobic compound and the $CO_2$-phile results in the spacer or connector group. Many such functional groups are know to those skilled in the art. The functional groups of the $CO_2$-phobic compound and the $CO_2$-phile(s) preferably results in a spacer group that enhances or does not substantially reduce the $CO_2$-philic nature of the compound of FIG. 19. Spacer groups may, for example, include divalent forms of an ester, a keto, an ether, a thio, an amido, an amino, a polyalkylene oxide, a phosphate, a sulfonyl, a sulfate, an ammonium, an alkylene or combinations thereof.

An end group (typically not a reactive functionality unless difunctionality is desired) at the other terminus of the $CO_2$-philic compounds of the present invention can be almost any group. However, such end groups preferably enhance or do not substantially reduce the $CO_2$-philic nature of the $CO_2$-philic analog of FIG. 19. Preferred end groups include, but are not limited to H, alkyl, alkenyl or ether groups.

Surfactants may, for example, be synthesized using these materials. Copolymerizations of oxiranes and $CO_2$ using sterically hindered alkoxy aluminum catalysts are "living" in character, and thus block copolymer synthesis is relatively straightforward. For example, one can generate a water-soluble surfactant by copolymerizing EO and $CO_2$, then removing the $CO_2$ before all of the EO is polymerized (via flashing). Conversely, one can begin a homopolymerization of EO, then added $CO_2$ (via simply opening a valve) part way through the polymerization. These techniques produce a carbonate-ether diblock material that does lowers interfacial tension of water. Generating an optimized $CO_2$-philic surfactant with a poly(ether-carbonate) $CO_2$-philic group simply requires, for example, (a) identifying the most appropriate carbonate (for example, CHO, EO- or PO-based), then determining the correct ratio of carbonate/ether block length to produce a $CO_2$-soluble surfactant. All the optimizing determinations are readily made experimentally.

Previous work on design of $CO_2$-philic surfactants has also identified both linear ammonium carboxylates and branched sodium sulfonates (for example, AOT) as useful structures. See Johnston, K. P.; Harrison, K. L.; Clarke, M. J.; Howdle, S.; Heitz, M. P.; Bright, F. V.; Carlier, C.; Randolph, T. W.; Science (1996), 271, 624; and Hoefling, T. A.; Enick, R. M.; Beckman, E. J.; J. Phys. Chem. (1991), 95, 7127.

To synthesize $CO_2$-philic analogs from the vinyl $CO_2$-philic compositions of the present invention, hydroxyterminal oligomers may, for example, generated by replacing the conventional initiator (AIBN) with a hydroxyfunctional analog, and by replacing the butyl mercaptan chain transfer agent with a hydroxy-thiol analog (Aldrich). See Okaya, T.; Sato, T.; in Polyvinyl Alcohol—Developments, Finch, C. A., editor (1992), John Wiley & Sons, New York, Chapter 5. This technique could also be used to generate surfactants directly by employing an inifer surfactant as described by Guyot and Vidal. See Guyot, A.; Vidal, F.; Polym. Bull. (1995), 34, 569 (c) Vidal, F.; and Hamaide, T.; Poym. Bull. (1995), 35, 1.

Ammonium carboxylate surfactants may, for example, be synthesized by reaction of the hydroxy-terminated oligomers with maleic anhydride, followed by neutralization with ammonium hydroxide. AOT analogs may generated via reaction of two equivalents of the hydroxy-oligomer with fumaryl chloride, followed by sulfonation with sodium hydrogen sulfite.

Experimental

Materials

All synthesis were carried out in purified argon atmosphere. Monomers and solvents were purified as described previously. Ethylene oxide was used as received. Epichlorohydrin (Aldrich Chemicals, Milwaukee, Wis.) was distilled under reduced pressure. Carbon dioxide and argon (both 99.99% purity from Praxair, Pittsburgh, Pa.) were passed through high pressure purifiers before use.

Vinyl acetate (VA) and ethyl vinyl ether (EVE) were obtained from Aldrich Chemical Company. Vinyl acetate was purified by passage through an inhibitor-sorbing column (Aldrich) to remove hydroquinone. Ethyl vinyl ether was distilled under an argon atmosphere. The initiator, 2,2' azoisobutyronitrile, was recrystallized twice from ether. Poly(ethyl vinyl ether), 20 repeat units, was generously donated by BASF Corporation (Ludwigshafen, GER).

All other chemicals were obtained from Aldrich Chemicals and used as received, unless otherwise noted.

Synthesis of Acetate Functionalized Poly (Epichlorohydrin)

Low molecular weight poly(epichlorohydrin) was used as the starting material to produce acetate-modified polymers with varying acetate content. In a typical polymerization reaction, boron trifluoride diethyl ether (1.5 ml, 0.0118 moles) was added dropwise to a solution of 20 ml epichlorohydrin (0.2557 moles) in 44 ml of toluene over 30 minutes at room temperature. After 4 hours the catalyst was deactivated with aqueous NaOH, and the organic phase was separated and dried over $CaCl_2$. The solvent was removed under reduced pressure at 50°C. and the polymer analyzed using NMR and GPC. Poly(epichlorohydrin) with 7 repeat units was produced with a yield of 90–95%. To generate higher molecular weight polymer (e. g. 25 repeat units), methylaluminoxane (kindly supplied by Akzo Nobel) was used as the initiator. The polymerization was stopped with methanolic hydrochloric acid and the polymer solution was filtered and processed as above.

For modification with acetate groups, the polymer was reacted with potassium acetate using a phase transfer catalyst (benzyltrimethyl ammonium chloride) in toluene (FIG. 2). The reaction mixture was heated to 50–80° C. for 24 hours. The solution was allowed to cool to room temperature and the remaining catalyst and potassium acetate were removed by filtration. The polymer solution was washed rapidly three times with cold water to remove any unreacted potassium acetate, then dried with magnesium sulfate. The solvent was removed under reduced pressure. The amount of acetate incorporated was determined by $^{13}C$ NMR from the ratio of the $CH_2Cl$ peak at 43–45 ppm and CO peak from acetate at 170–171 ppm. Maximum degree of modification was 45%.

Synthesis of Poly(Glycidyl Acetate)

Polymers containing only acetate groups in the side chain were synthesized by polymerization of glycidyl acetate in a similar manner as epichlorohydrin, using a sterically hindered aluminum catalyst of the type $((H_5C_6)_3C-O)_2-Al-O-CH(CH_3)_2$. The glycidyl acetate was synthesized according to known procedures described in the literature. See Davies, A. G.; Alwyn, G.; Hawari, J. A.-A.; Muggleton, B.; Tse, M.-W. *J. Chem. Soc. Perkin Trans.*, 2, 1981, 1132.

Synthesis of Catalysts for Oxirane/$CO_2$ Copolymerization

These catalysts were synthesized under argon, in glass flasks that were heated to 200° C. and then evacuated and flushed with inert gas three times. The catalysts used for the copolymerization of propylene oxide and carbon dioxide were monofunctional (1) or difunctional (2) sterically-hindered aluminum alkoxides or phenoxides (FIG. 6). First, triisobutylaluminum was reacted with tri(phenyl)methanol or a sterically hindered phenol, then with an appropriate alcohol or glycol. The $^{27}Al$-NMR spectra of the catalysts showed that the sterically hindered aluminum catalysts exhibited essentially only pentacoordination. If Al atom was hexacoordinated then then $^{27}Al$ NMR would also show a peak at 0 ppm but the pentacoordinated species only showed a peak at appoximately 60 ppm. These NMR results suggest that the catalysts exhibited one species of active site (unlike previously reported catalysts for the polymerization of oxiranes and carbon dioxide); which perhaps explains the living character of the polymerizations subsequently observed.

In a typical experiment 10 mL tri-isobutyl aluminum (TIBA), as a 1.0 molar solution in toluene, was reacted with 5.207g (0.02 mol) tri(phenyl)methanol at 400 for 2–4 hours and then 0.77 mL (0.01 mol) isopropanol was added dropwise, and the mixture was stirred for two hours. The suspension of catalyst in toluene was then cooled to room temperature, the solvent was removed with a syringe and the catalyst washed twice with a small amount of dried toluene. The remaining solvent was then removed under vacuum at 50° C. The aluminum catalysts with sterically hindered phenoxide substituents were used as a toluene solution.

Copolymerization of Cyclic Ethers and Carbon Dioxide.

Copolymerization of cyclic ethers and carbon dioxide was performed in either a 25 mL or 35 mL high-pressure reactor equipped with magnetic stirrer and pressure and temperature indicators. Prior to the experiment the reactor was heated to 200° C., evacuated, and then cooled to room temperature under an argon blanket. The desired amount of aluminum catalyst was introduced to the reactor under an argon blanket, the reactor was sealed and evacuated for 15–20 minutes, then finally flushed with argon. The soluble aluminum compounds were used as a toluene solution and introduced with a syringe. The oxirane was added alone using a syringe, or as a mixture with $CO_2$ using a high-pressure syringe pump (High Pressure Equipment Co.). After injection of the reagents, the reactor was isolated and heated to the prescribed temperature (40–60° C.). After the desired time the pressure was slowly released, and the reaction was terminated with methanolic hydrochloric acid. The polymer solution was filtered, processed and analyzed. The amount of carbonate incorporated into the polymer was determined from the integrals of the ether protons peaks at approximately 3.4–3.6 ppm and the carbonate bound protons at 4.8 ppm from $^1H$-NMR. The reaction of cyclic ethers and carbon dioxide produced copolymers inclduding both ether and carbonate linkages.

Synthesis of Acetate Terminated Poly(propylene oxide)

Poly(propylene) oxide (monobutyl ether) with 7 or 21 repeat units was reacted with an excess of acetyl chloride in toluene for 24 hours. The residual reactant and solvent were subsequently removed under vacuum.

Synthesis of poly(vinyl acetate)

A three-neck glass flask evacuated with argon was charged with 10 ml (0.1085 moles) of vinyl acetate, 20 ml of toluene, and 0.228 g of 2,2' azoisobutyronitrile (0.00139 moles). The reaction mixture was then heated to 60° C. for 4 hours. n-Butyl mercaptan was used as chain transfer agent; amounts employed varied as the desired molecular weight varied.

Synthesis of poly(ethyl vinyl ether)

A three-neck glass flask evacuated with argon was charged with 10 ml (0.1279 moles) of ethyl vinyl ether and 20 ml of toluene. Boron trifluoride diethyl etherate (0.250 ml, 0.0016 moles) was added dropwise to the EVE solution, which was kept at 20° C. throughout the reaction. The reaction was allowed to proceed for 24 hours and then was terminated with dilute aqueous sodium hydroxide. The resulting mixture was extracted with ether to remove the polymer and the ether solution was re-washed with aqueous dilute sodium hydroxide to remove the residual catalyst residue. The ether solution was then dried with magnesium sulfate and filtered.

Synthesis of poly(vinyl acetate co-ethyl vinyl ether)

In a typical reaction, a stainless steel reactor (50 cm$^3$, manufactured at the University of Pittsburgh) was charged with 10 ml of ethyl vinyl ether (0.1046 moles), 2 ml of vinyl acetate (0.0217 moles), and 0.228 g of 2,2' azobis (isobutyrnitrile) (0.00139 moles). The reactor was sealed and then submersed in an oil bath. The temperature in the oil bath was raised to 60° C. and the reaction was allowed to proceed at the vapor pressure of the monomer mixture for 4 hours. The polymer was recovered with methanol. The solvent was subsequently removed under reduced pressure.

Phase Behavior Measurements

The phase behavior of the copolymers was measured using a high-pressure, variable-volume view cell (D. B. Robinson & Assoc.). This cell is a quartz tube containing a floating piston. The entire tube assembly is encased in a windowed, stainless steel vessel capable of supporting pressures up to 500 bar. A known amount of solute was added to the view-cell chamber above the piston. The chamber was then sealed and charged with liquid $CO_2$. The pressure on the sample was altered at constant composition via injection of silicone oil, which moved the floating piston higher in the quartz tube. Initially, the pressure was raised to the point where a clear, single-phase solution was obtained. The phase boundary (cloud point, or miscibility) was found subsequently by lowering the pressure until the solution became cloudy.

Analyses

All $^1$H NMR spectra were recorded on a Bruker DMX 300 instrument where the polymers were dissolved in d-chloroform with tetramethylsilane used as the internal reference. The $^{27}$AL-NMR (75.468 MHz) spectra of the catalysts were recorded as known in the art. Molecular weights of the product polymers were determined using a Waters 150 CV gel permeation chromatograph, equipped with 10$^4$, 10$^3$, 500 and 100 Å ultrastyragel columns. THF was used as eluent and calibration was performed using polystyrene standards. IR spectra were recorded on a Mattson Genesis II FTIR. Phase behavior of the polymers was studied in a variable volume high pressure view cell, equipped with stirrer and temperature and pressure controllers.

Molecular weight and the molecular weight distribution of the polymers were measured using a Waters 150 CV gel permeation chromatograph, equipped with 10$^4$, 10$^3$, 500 and 100 Å Ultrastyragel columns.

Although the present invention has been described in detail in connection with the above examples, it is to be understood that such detail is solely for that purpose and that variations can be made by those skilled in the art without departing from the spirit of the invention except as it may be limited by the following claims.

What is claimed is:

1. A method of synthesizing a $CO_2$-philic analog of a $CO_2$-phobic compound that is more $CO_2$-philic than the $CO_2$-phobic compound, comprising the step of:

reacting the $CO_2$-phobic compound with a $CO_2$-philic compound, wherein the $CO_2$-philic compound is a polyether substituted with at least one side group incorporating a Lewis base, a poly(ether-carbonate), a poly(ether-carbonate) substituted with at least one side group incorporating a Lewis base, a vinyl polymer substituted with at least one side groups incorporating a Lewis base, a poly(ether-ester) or a poly(ether-ester) substituted with at least one side groups incorporating a Lewis base to create the $CO_2$-philic analog.

2. The method of claim 1 wherein the $CO_2$-philic compound is a polyether substituted with at least one side group incorporating a Lewis base, a poly(ether-carbonate), a poly (ether-carbonate) substituted with at least one side group incorporating a Lewis base, or a vinyl polymer substituted with at least one side group incorporating a Lewis base.

3. The method of claim 1 wherein the $CO_2$-philic contains no F or Si atoms.

4. The method of claim 1 wherein the $CO_2$-philic compound is a polyether copolymer incorporating the repeat units

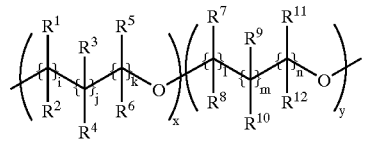

wherein $R^1$, $R^2$, $R^3$, $R^4$, $R^5$, $R^6$, $R^7$, $R^8$, $R^9$, $R^{10}$, $R^{11}$, and $R^{12}$ are, independently or different, H, an alkyl group, —$(R^{22'})_z$ $R^{22}$, or $R^4$ and $R^6$ form of carbon cyclic chain of 3 to 8 carbon atoms, wherein $R^{22'}$ is an alkylene group and z is 0 or 1, and $R^{22}$ is a Lewis base group, wherein at least one of $R^1$, $R^2$, $R^3$, $R^4$, $R^5$, $R^6$, $R^7$, $R^8$, $R^9$, $R^{10}$, $R^{11}$, and $R^{12}$ is —$(R^{22'})_z R^{22}$, wherein, i, j, k, l, m, and n are independently, the same or different, 0, 1 or 2, at least one of i, j, and k being 1 or 2 and at least one of l, m, and being 1 or 2, and x and y are integers.

5. The method of claim 4 wherein $R^{22}$ is —O—C(O)—$R^{23}$, —C(O)—$R^{23}$, —O—P(O)—(O—$R^{23}$)$_2$, or —$NR^{23}R^{23'}$, wherein $R^{23}$ and $R^{23'}$ are independently, the same or different, an alkyl group.

6. The method of claim 4 wherein $R^{22'}$ is (CH$_2$)$_a$—, and a is an integer between 0 and 5.

7. The method of claim 6 wherein a is 1 or 2 and i is 0, j is 1, k is 1, l is 0, m is 1 and n is 1.

8. The method of claim 7 wherein $R^3$, $R^4$, $R^5$, $R^9$, $R^{10}$, and $R^{11}$ are H, $R^6$ is an alkyl group and $R^{12}$ is —(CH$_2$)$_a$—$R^{22}$.

9. The method of claim 8 wherein $R^{22}$ is O—C(O)—$R^{23}$, —$R^{23}$, —O—P(O)—(O—$R^{23}$)$_2$, or —$NR^{23}R^{23'}$, wherein $R^{23}$ and $R^{23'}$ are independently, the same or different, an alkyl group.

10. The method of claim 8 wherein $R^{22}$ is —O—C(O)—$R^{23}$.

11. The method of claim 10 wherein $R^{23}$ is a methyl group.

12. The method of claim 4 wherein the polyether copolymer contains no F or Si atoms.

13. The method of claim 1 wherein the CO$_2$-philic compound is a poly(ether-carbonate) copolymer incorporating the repeat units:

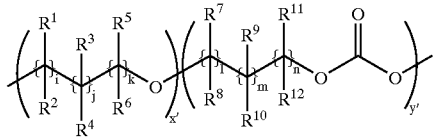

wherein R$^1$, R$^2$, R$^3$, R$^4$, R$^5$, R$^6$, R$^7$, R$^8$, R$^9$, R$^{10}$, R$^{11}$, and R$^{12}$ are independently, the same or different, H, an alkyl group, —(R$^{22'}$)$_z$R$^{22}$, or R$^4$ and R$^6$ form of carbon cyclic chain of 3 to 8 carbon atoms, wherein R$^{22'}$ is an alkylene group and z is 0 or 1, and R$^{22}$ is a Lewis base group, wherein, i, j, k, l, m, and n are independently, the same or different, 0, 1 or 2, at least one of i, j, and k being 1 or 2 and at least one of l, m, and being 1 or 2, and x' and y' are integers.

14. The method of claim 13 wherein R$^{22}$ is —O—C(O)—R$^{23}$, —C(O)—R$^{23}$, —O—P(O)—(O—R$^{23}$)$_2$, or —NR$^{23}$R$^{23'}$, wherein R$^{23}$ and R$^{23'}$ are independently, the same or different, an alkyl group.

15. The method of claim 14 wherein R$^{22'}$ is —(CH$_2$)$_a$— and a is an integer between 0 and 5.

16. The method of claim 15 wherein a is 1 or 2.

17. The method of claim 13 wherein i is 0, j is 1, k is 1, l is 0, m is 1 and n is 1 and R$^3$, R$^4$, R$^5$, R$^9$, R$^{10}$, and R$^{11}$ are H, R$^6$ is an alkyl group and R$^{12}$ is an alkyl group.

18. The method of claim 13 wherein the poly(ether-carbonate) copolymer contains no F or Si atoms.

19. The method of claim 1 wherein the vinyl polymer is a copolymer incorporating the repeat units:

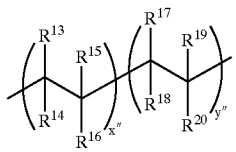

wherein R$^3$, R$^{14}$ R$^{15}$, R$^{16}$ R$^{17}$ R$^8$, R$^{19}$, and R$^{20}$ are, independently, the same or different, H, an alkyl group, an alkenyl group, —O—R$^{24}$, —(R$^{22'}$)$_z$R$^{22}$ wherein, R$^{22'}$ is an alkylene group, R$^{22}$ is a Lewis base group and z is 0 or 1, R$^{24}$ is an alkyl group, wherein at least one of R$^{13}$, R$^{14}$, R$^{15}$, R$^{16}$, R$^{17}$, R$^{18}$, R$^{19}$, and R$^{20}$ is —(R$^{22'}$)$_z$R$^{22}$, and x" and y" are integers.

20. The method of claim 19 wherein R$^{22'}$ is —(CH$_2$)$_a$— and a is an integer between 0 and 5.

21. The method of claim 20 wherein a is 1 or 2 and R$^{22}$ is —O—C(O)—R$^{23}$, —C(O)—R$^{23}$, —O—P(O)—(O—R$^{23}$)$_2$, or —NR$^{23}$R$^{23'}$, wherein R$^{23}$ and R$^{23'}$ are independently, the same or different, an alkyl group.

22. The method of claim 21 wherein R$^{22}$ is —O—C(O)—R$^{23}$.

23. The method of claim 19 wherein the vinyl copolymer contains no F or Si atoms.

24. The method of claim 1 wherein the CO$_2$-philic compound is a poly(ether-ester) copolymer incorporating the repeat units

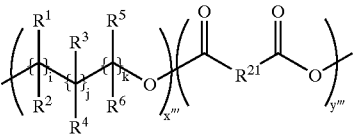

wherein R$^1$, R$^2$, R$^3$, R$^4$, R$^5$ and R$^6$ are, independently, the same or different, H, an alkyl group, —(R$^{22'}$)$_z$R$^{22}$, or R$^4$ and R$^6$ form of carbon cyclic chain of 3 to 8 carbon atoms, wherein z is 0 or 1, R$^{22'}$ is an alkylene group and R$^{22}$ is a lewis base group, wherein, i, j and k are independently, the same or different, 0, 1 or 2, at least one of i, j, and k being 1 or 2, R$^{21}$ is an alkylene group, a cycloalkylene group, a difunctional ester group, or a difunctional ether group, and x''' and y''' are integers.

25. The method of claim 24 wherein at least one of R$^1$, R$^2$, R$^3$, R$^4$, R$^5$ and R$^6$ is —(R$^{22'}$)$_z$R$^{22}$ and R$^{22}$ is —O—C(O)—R$^{23}$, —C(O)—R$^{23}$, —O—P(O)—(O—R$^{23}$)$_2$, or —NR$^{23}$R$^{23'}$, wherein R$^{23}$ and R$^{23'}$ are independently, the same or different, an alkyl group.

26. The method of claim 25 wherein R$^{22'}$ is —(CH$_2$)$_a$— and a is an integer between 0 and 5.

27. The method of claim 26 wherein a is 1 or 2 and i is 0, j is 1, and k is 1.

28. The method of claim 24 wherein R$^{22}$ is —O—C(O)—R$^{23}$, —C(O)—R$^{23}$, —O—P(O)—(O—R$^{23}$)$_2$, or —NR$^{23}$R$^{23'}$, wherein R$^{23}$ and R$^{23'}$ are independently, the same or different, an alkyl group.

29. The method of claim 27 wherein R$^{22}$ is —O—C(O)—R$^{23}$.

30. A surfactant for use in carbon dioxide, the surfactant comprising a CO$_2$-phobic group covalently linked to a CO$_2$-philic segment, wherein the CO$_2$-philic segment comprises a polyether substituted with at least one side group incorporating a Lewis base, a poly(ether-carbonate), a poly(ether-carbonate) substituted with at least one side group incorporating a Lewis base, a vinyl polymer substituted with at least one side group incorporating a Lewis base, a poly(ether-ester) or a poly(ether-ester) substituted with at least one side group incorporating a Lewis base.

31. The surfactant of claim 30 wherein the polyether is a polyether copolymer incorporates the repeat units

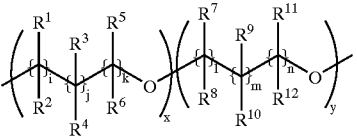

wherein R$^1$, R$^2$, R$^3$, R$^4$, R$^5$, R$^6$, R$^7$, R$^8$, R$^9$, R$^{10}$ R$^{11}$ and R$^{12}$ are independently, the same or different, H, an alkyl group, —(R$^{22'}$)$_z$R$^{22}$, or R$^4$ and R$^6$ form of carbon cyclic chain of 3 to 8 carbon atoms, wherein R$^{22'}$ is an alkylene group and z is 0 or 1, and R$^{22}$ is a Lewis base group, wherein at least one of R$^1$, R$^2$, R$^3$, R$^4$, R$^5$, R$^6$, R$^7$, R$^8$, R$^9$, R$^{10}$, R$^{11}$, and R$^{12}$ is —(R$^{22'}$)$_z$R$^{22}$, wherein, i, j, k, l, m, and n are independently, the same or different, 0, 1 or 2, at least one of i, j, and k being 1 or 2 and at least one of l, m, and being 1 or 2, and x and y are integers.

32. The surfactant of claim 31 wherein R$^{22}$ is —O—C(O)—R$^{23}$, —C(O)—R$^{23}$, —O—P(O)—(O—R$^{23}$)$_2$, or —NR$^{23}$R$^{23'}$, wherein R$^{23}$ and R$^{23'}$ are independently, the same or different, an alkyl group.

33. The surfactant of claim 32 wherein R$^{22'}$ is —(CH$_2$)$_a$— and a is an integer between 0 and 5.

34. The surfactant of claim 30 wherein the poly(ether-carbonate) copolymer incorporates the repeat units:

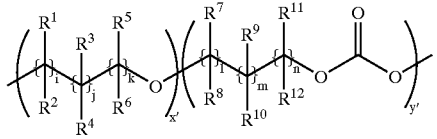

wherein $R^1, R^2, R^3, R^4, R^5, R^6, R^7, R^8, R^9, R^{10}, R^{11}$, and $R^{12}$ are independently, the same or different, H, an alkyl group, $—(R^{22'})_z R^{22}$, or $R^4$ and $R^6$ form of carbon cyclic chain of 3 to 8 carbon atoms, wherein $R^{22'}$ is an alkylene group and z is 0 or 1, and $R^{22}$ is a Lewis base group, wherein, i, j, k, l, m, and n are independently, the same or different, 0, 1 or 2, at least one of i, j, and k being 1 or 2 and at least one of 1, m, and being 1 or 2, and x' and y' are integers.

35. The surfactant of claim 34 wherein $R^{22}$ is $—O—C(O)—R^{23}$, $—C(O)—R^{23}$, $—O—P(O)—(O—R^{23})_2$, or $—NR^{23}R^{23'}$, wherein $R^{23}$ and $R^{23'}$ are independently, the same or different, an alkyl group.

36. The surfactant of claim 36 wherein $R^{22'}$ is $—(CH_2)_a—$ and a is an integer between 0 and 5.

37. The surfactant of claim 30 wherein the vinyl polymer is a copolymer incorporating the repeat units:

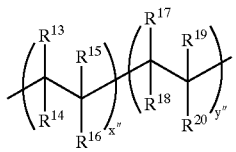

wherein $R^{13}, R^{14}, R^{15}, R^{16}, R^{17}, R^{18}, R^{19}$, and $R^{20}$ are, independently, the same or different, H, an alkyl group, an alkenyl group, $—O—R^{24}$, $—(R^{22'})_z R^{22}$, wherein, $R^{22'}$ is an alkylene group, $R^{22}$ is a Lewis base group and z is 0 or 1, $R^{24}$ is an alkyl group, wherein at least one of $R^{13}, R^{14}, R^{15}, R^{16}, R^{17}, R^{18}, R^{19}$, and $R^{20}$ is $—(R^{22'})_z R^{22}$, and x" and y" are integers.

38. The surfactant of claim 37 wherein $R^{22'}$ is $—(CH_2)_a—$ and a is an integer between 0 and 5.

39. The surfactant of claim 38 wherein a is 1 or 2 and $R^{22}$ is $—O—C(O)—R^{23}$, $—C(O)—R^{23}$, $—O—P(O)—(O—R^{23})_2$, or $—NR^{23}R^{23'}$, wherein $R^{23}$ and $R^{23'}$ are independently, the same or different, an alkyl group.

40. The surfactant of claim 39 wherein $R^{22}$ is $—O—C(O)—R^{23}$.

41. The surfactant of claim 30 wherein the $CO_2$-philic compound is a poly(ether-ester) copolymer incorporating the repeat units

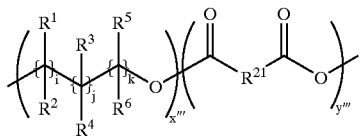

wherein $R^1, R^2, R^3, R^4, R^5$ and $R^6$ are, independently, the same or different, H, an alkyl group, $—(R^{22'}) R^{22}$, or $R^4$ and $R^6$ form of carbon cyclic chain of 3 to 8 carbon atoms, wherein z is 0 or 1, $R^{22'}$ is an alkylene group and $R^{22}$ is a lewis base group, wherein, i, j and k are independently, the same or different, 0, 1 or 2, at least one of i, j, and k being 1 or 2, $R^{21}$ is an alkylene group, a cycloalkylene group, a difunctional ester group, or a difunctional ether group, and x''' and y''' are integers.

42. The surfactant of claim 41 wherein at least one of $R^1, R^2, R^3, R^4, R^5$ and $R^6$ is $—(R^{22'})_z R^{22}$, the lewis base group is $O—C(O)—R^{23}$, $—C(O)—R^{23}$, $—O—P(O)—(O—R^{23})_2$, or $^{NR23}R^{23'}$ wherein $R^{23}$ and $R^{23'}$ are independently, the same or different, an alkyl group.

43. The surfactant of claim 42 wherein $R^{22'}$ is $—(CH_2)_a—$ and a is an integer between 0 and 5.

44. The surfactant of claim 30 wherein the $CO_2$-phobic group is H, a carboxylic acid group, a hydroxy group, a phosphate group, a phosphate ester group, a sulfonyl group, a sulfonate group, a sulfate group, a branched or straight chained polyalkylene oxide group, an amine oxide group, an alkenyl group, a nitryl group, a glyceryl group, an ammonium, an alkyl ammonium, an aryl group unsubstituted or substituted with an alkyl group or an alkenyl group, or a carbohydrate unsubstituted with an alkyl group or an alkenyl group.

45. The surfactant of claim 30 wherein the $CO_2$-phobic group incorporates at least one ion selected from the group of $H^+$, $Na^{+2}$, $Li^+$, $K^+$, $NH_4^+$, $Ca^{+2}$, $Mg^{+2}$, $Cl^-$, $Br^-$, $I^-$, mesylate and tosylate.

46. A chelating agent for use in carbon dioxide, the chelating agent comprising a $CO_2$-phobic chelating group covalently linked to a $CO_2$-philic segment, wherein the $CO_2$-philic segment comprises a polyether substituted with side groups incorporating a Lewis base, a poly(ether-carbonate), a poly(ether-carbonate) substituted with side groups incorporating a Lewis base, a vinyl polymer substituted with side groups incorporating a Lewis base, or a poly(ether-ester).

47. The chelating agent of claim 46 wherein the chelating group is a polyaminocarboxylic acid group, a thoicarbamate group, a dithoicarbamate group, a thiol group, a dithiol group, a picolyl amine group, a bis(picolyl amine) group or a phosphate group.

48. A method of synthesizing a $CO_2$-philic copolymer comprising the step of copolymerizing at least two monomers, wherein a polymer formed from homopolymerization of one of the monomers has a $T_g$ of less than approximately 250 K and a steric factor less than approximately 1.8, at least one of the monomers results a Lewis base group in the copolymer, and the resultant $CO_2$-phile does not contain both hydrogen bond donors and acceptors.

49. The method of claim 48 wherein a Lewis base group is within the monomer backbone.

50. The method of claim 48 wherein the Lewis group is a pendant group from the backbone of the at least one monomer.

51. The method of claim 50 wherein the Lewis base group is separated from the $CO_2$-phile backbone by 0 to 5 atoms.

52. The method of claim 51 wherein the Lewis base group is separated from the $CO_2$-phile backbone by 1 to 2 atoms.

53. The method of claim 48 wherein the $CO_2$-phile incorporates no F or Si atoms.

54. The method of claim 48 wherein the copolymer has less than 400 repeat units.

55. The method of claim 48 wherein the copolymer has less that 200 repeat units.

56. The method of claim 48 wherein the copolymer between 5 and 50 repeat units.

57. The method of claim 48 wherein repeat units of the copolymer incorporating the Lewis base are in the range of 1 to 50 percent of all of the repeat units.

58. The method of claim 48 wherein repeat units of the copolymer incorporating the Lewis base are in the range of 5 to 35 percent of all of the repeat units.

59. The method of claim 48 wherein repeat units of the copolymer incorporating the Lewis base are in the range of 10 to 25 percent of all of the repeat units.

60. The method of claim 48 a first monomer is chosen such that a polymer formed from homopolymerization of the first monomer has a $T_g$ of less than approximately 250 K and a steric factor less than approximately 1.8 and a second and different monomer results a Lewis base group in the copolymer.

61. A method of synthesizing a $CO_2$-phile comprising the step of copolymerizing carbon dioxide and at least one oxirane.

62. The method of claim 61 wherein the oxirane is ethylene oxide, propylene oxide cyclohexene oxide, or epichlorohydrin.

* * * * *